United States Patent
Yajima et al.

(10) Patent No.: US 10,225,525 B2
(45) Date of Patent: Mar. 5, 2019

(54) INFORMATION PROCESSING DEVICE, STORAGE MEDIUM, AND CONTROL METHOD

(71) Applicant: SONY CORPORATION, Tokyo (JP)

(72) Inventors: Masakazu Yajima, Chiba (JP); Kazuyuki Sakoda, Chiba (JP); Takatoshi Nakamura, Tokyo (JP); Mitsuru Takehara, Tokyo (JP); Yuki Koga, Tokyo (JP); Tomoya Onuma, Shizuoka (JP); Akira Tange, Tokyo (JP)

(73) Assignee: SONY CORPORATION, Tokyo (JP)

(*) Notice: Subject to any disclaimer, the term of this patent is extended or adjusted under 35 U.S.C. 154(b) by 48 days.

(21) Appl. No.: 15/321,691

(22) PCT Filed: Mar. 31, 2015

(86) PCT No.: PCT/JP2015/060227
§ 371 (c)(1),
(2) Date: Dec. 22, 2016

(87) PCT Pub. No.: WO2016/006287
PCT Pub. Date: Jan. 14, 2016

(65) Prior Publication Data
US 2017/0163938 A1    Jun. 8, 2017

(30) Foreign Application Priority Data
Jul. 9, 2014 (JP) .................. 2014-141024

(51) Int. Cl.
*H04N 7/18* (2006.01)
*G08B 21/02* (2006.01)
(Continued)

(52) U.S. Cl.
CPC ......... *H04N 7/181* (2013.01); *G06K 9/00288* (2013.01); *G06K 9/00771* (2013.01);
(Continued)

(58) Field of Classification Search
CPC ........... G06K 9/00288; G06K 9/00771; G08B 21/02; G08B 25/00; G08B 25/10;
(Continued)

(56) References Cited

U.S. PATENT DOCUMENTS 6,670,984 B1 * 12/2003 Tanaka .................. H04N 7/181
                                                    348/14.1
6,809,760 B1 * 10/2004 Takagi .................... G01S 3/781
                                                    348/143
(Continued)

FOREIGN PATENT DOCUMENTS

JP    2001-320696 A    11/2001
JP    2004-128997 A    4/2004
(Continued)

*Primary Examiner* — Helen Shibru
(74) *Attorney, Agent, or Firm* — Xsensus LLP

(57) ABSTRACT

[Object] To provide an information processing device, a storage medium, and a control method which are capable of assisting more comfortable and safer living by providing information based on real-time images collected from a plurality of imaging devices. [Solution] Provided is an information processing device, including: a search unit configured to search for an imaging device around a specific information processing device; a providing unit configured to provide information related to the searched imaging device and an angle of view of the imaging device to a user; and an acquiring unit configured to acquire an image imaged by an imaging device selected by the user. The providing unit provides the image acquired by the acquiring unit to the user.

9 Claims, 21 Drawing Sheets

(51) Int. Cl.
  *G08B 25/00* (2006.01)
  *G08B 25/10* (2006.01)
  *G08G 1/16* (2006.01)
  *H04N 5/225* (2006.01)
  *G06K 9/00* (2006.01)
  *H04N 5/232* (2006.01)

(52) U.S. Cl.
  CPC .............. *G08B 21/02* (2013.01); *G08B 25/00* (2013.01); *G08B 25/10* (2013.01); *G08G 1/16* (2013.01); *H04N 5/225* (2013.01); *H04N 5/23206* (2013.01); *H04N 7/18* (2013.01)

(58) Field of Classification Search
  CPC ...... G08G 1/16; H04N 5/225; H04N 5/23206; H04N 7/18
  USPC ......................................................... 348/159
  See application file for complete search history.

(56) References Cited

U.S. PATENT DOCUMENTS

| | | | | |
|---|---|---|---|---|
| 6,856,346 | B1* | 2/2005 | Kobayashi | H04N 5/23203 348/211.11 |
| 2001/0045983 | A1* | 11/2001 | Okazaki | H04L 63/101 348/211.99 |
| 2006/0132605 | A1* | 6/2006 | Watanabe | H04N 1/00137 348/159 |
| 2007/0052801 | A1* | 3/2007 | Shimamura | G08B 13/19658 348/140 |
| 2010/0002082 | A1* | 1/2010 | Buehler | G08B 13/19645 348/159 |
| 2011/0069172 | A1* | 3/2011 | Hazzani | G08B 13/19645 348/159 |
| 2014/0186048 | A1* | 7/2014 | Oshima | H04B 10/541 398/118 |
| 2015/0139659 | A1* | 5/2015 | Oshima | H04B 10/116 398/118 |
| 2016/0323559 | A1* | 11/2016 | Matsunobu | H04N 13/296 |
| 2018/0204381 | A1* | 7/2018 | Kanatsu | H04N 13/282 |

FOREIGN PATENT DOCUMENTS

| | | |
|---|---|---|
| JP | 2005-222153 A | 8/2005 |
| JP | 2008-172427 A | 7/2008 |
| JP | 2012-015795 A | 1/2012 |

* cited by examiner

FIG. 7
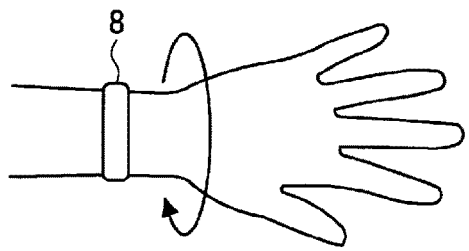
OPERATION OF MOVING
IN ROW DIRECTION/
ZOOM-IN OPERATION
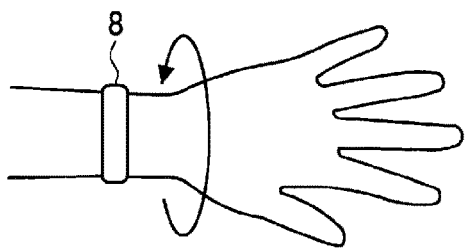
OPERATION OF RETURNING
IN ROW DIRECTION/
ZOOM-OUT OPERATION

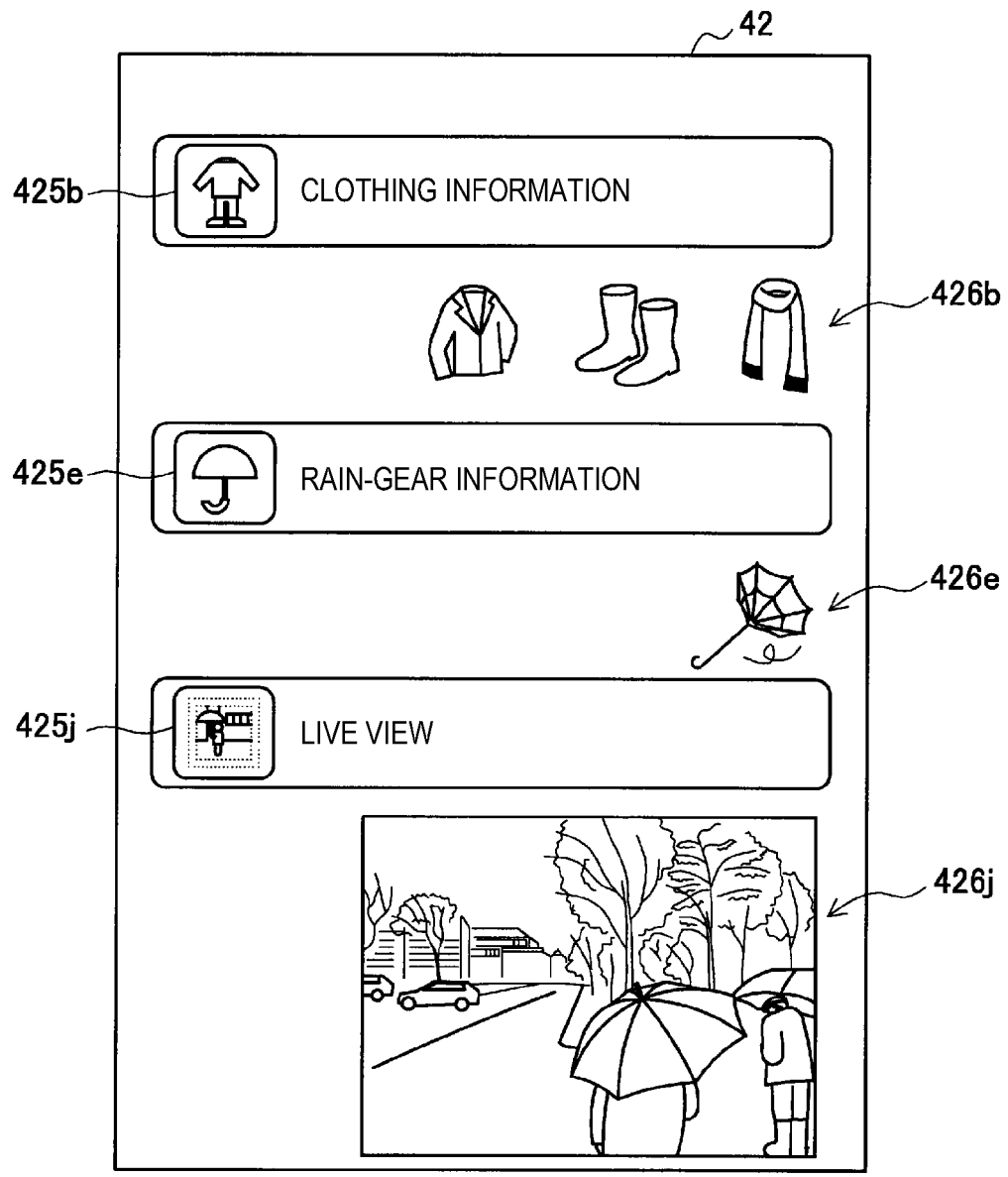

INFORMATION PROCESSING DEVICE, STORAGE MEDIUM, AND CONTROL METHOD

CROSS REFERENCE TO RELATED APPLICATIONS

This application is a U.S. National Phase of International Patent Application No. PCT/JP2015/060227 filed on Mar. 31, 2015, which claims priority benefit of Japanese Patent Application No. JP 2014-141024 filed in the Japan Patent Office on Jul. 9, 2014. Each of the above-referenced applications is hereby incorporated herein by reference in its entirety.

TECHNICAL FIELD

The present disclosure relates to an information processing device, a storage medium, and a control method.

BACKGROUND ART

In recent years, with the rapid progress of information communication technology, various information processing systems for assisting more comfortable and safer living have been proposed. For example, an information system of collecting videos of a plurality of monitoring cameras via a network, analyzing traffic congestion, and using an analysis result for analysis of accidents or crimes has been proposed.

Further, Patent Literature 1 discloses an assistance system in which a server receives a video of a camera installed at an intersection through wireless communication, and informs a pedestrian of the presence of a vehicle or informs a vehicle of the presence of a pedestrian based on an analysis result of a video.

CITATION LIST

Patent Literature

Patent Literature 1: JP 2005-222153A

DISCLOSURE OF INVENTION

Technical Problem

Here, the number of monitoring cameras to be installed is expected to be further increased in the future, and if it is possible to provide a video acquired through such a monitoring camera in real time in response to a request from a user therearound, it is possible to assist more comfortable and safer living.

Further, in order to install a monitoring camera newly, it is necessary to secure a place, but if a road reflecting mirror already installed on a road or an intersection can be provided with a photographing function, it is unnecessary to secure a new installation place.

In this regard, the present disclosure proposes an information processing device, a storage medium, and a control method which are capable of assisting more comfortable and safer living by providing information based on real-time images collected from a plurality of imaging devices.

Solution to Problem

According to the present disclosure, there is provided an information processing device, including: a search unit configured to search for an imaging device around a specific information processing device; a providing unit configured to provide information related to the searched imaging device and an angle of view of the imaging device to a user; and an acquiring unit configured to acquire an image imaged by an imaging device selected by the user. The providing unit provides the image acquired by the acquiring unit to the user.

According to the present disclosure, there is provided a storage medium having a program stored therein, the program causing a computer to function as: a search unit configured to search for an imaging device around a specific information processing device; a providing unit configured to provide information related to the searched imaging device and an angle of view of the imaging device to a user; and an acquiring unit configured to acquire an image imaged by an imaging device selected by the user. The providing unit provides the image acquired by the acquiring unit to the user.

According to the present disclosure, there is provided a control method, including: searching for an imaging device around a specific information processing device; providing information related to the searched imaging device and an angle of view of the imaging device to a user; acquiring an image imaged by an imaging device selected by the user; and providing the acquired image to the user.

Advantageous Effects of Invention

As described above, according to the present disclosure, it is possible to assist more comfortable and safer living by providing information based on real-time images collected from a plurality of imaging devices.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a diagram for describing an operation of instructing client movement and zoom-in/out in a row direction.

FIG. 21 is a diagram for describing an example of a display screen according to the fifth embodiment.

MODE(S) FOR CARRYING OUT THE INVENTION

Figure 1:
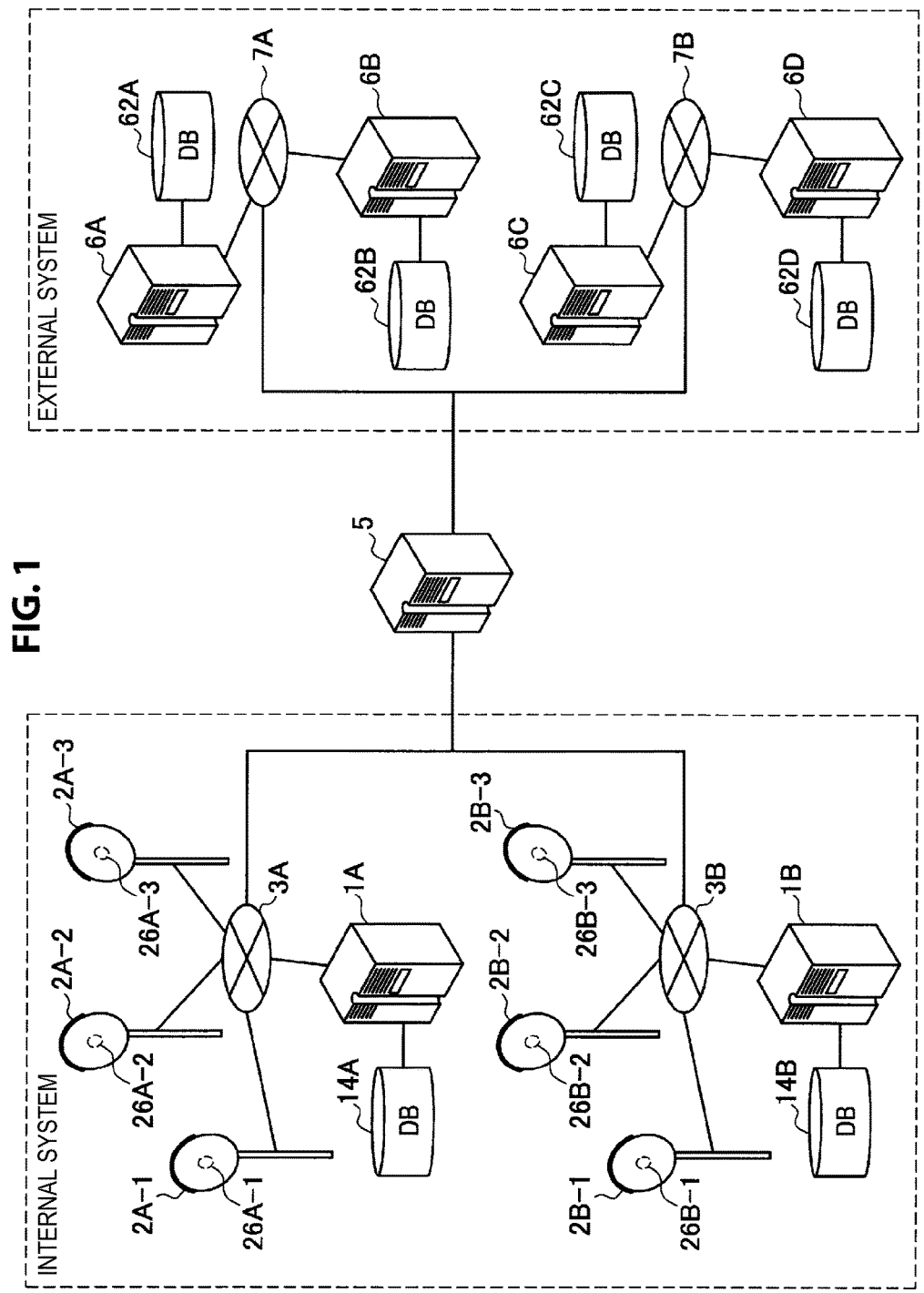
FIG. 1 is a diagram for describing an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Overview of information processing system according to embodiment of present disclosure
2. Basic configuration
2-1. Configuration of information processing server
2-2. Configuration of client (road reflecting mirror type camera)
2-3. Supplement
3. Embodiments
3-1. First embodiment
3-2. Second embodiment
3-3. Third embodiment
3-4. Fourth embodiment
3-5. Fifth embodiment
4. Conclusion <<1. Overview of information processing system according to embodiment of present disclosure>>

First, an overview of the information processing system according to an embodiment of the present disclosure will be described with reference to FIG. 1. As illustrated in FIG. 1, the information processing system according to the present embodiment includes an information processing server 1 and a plurality of road reflecting mirror type cameras (clients) 2-1 to 2-3 which are connected to a network 3. The information processing server 1 controls a plurality of road reflecting mirror type cameras 2-1 to 2-3 which are installed in each zone or a specific range. The information processing server 1 controls a database (DB) 14 such that images imaged by the road reflecting mirror type cameras 2-1 to 2-3 are accumulated. The DB 14 may be installed in the information processing server 1. For example, the information processing server 1 according to the present embodiment provides the user with a video imaged by the road reflecting mirror type camera 2 located around the user in real time in response to a request from a user terminal. Thus, the user can view an image captured by a nearby road reflecting mirror type camera 2 in real time and check a situation of a place serving as a blind spot to the user or a place some distance away.

Further, the road reflecting mirror type camera (client) 2 includes an imaging unit 26 installed therein. For example, when the reflecting mirror is a half mirror, the imaging unit 26 is installed on the back side of the middle of the reflecting mirror and can image a surrounding area via the reflecting mirror.

In FIG. 1, a system A in which a plurality of road reflecting mirror type cameras 2A1-1 to 2A-3 installed in a certain zone A and an information processing server 1A are connected to a network 3A and a system B in which a plurality of road reflecting mirror type cameras 2B1-1 to 2B-3 installed in a certain zone B and an information processing server 1B are connected to a network 3B are illustrated.

Further, the system A and the system B may be connected to an external system via a relay server 5. The external system includes dedicated servers 6 (6A to 6D) and DBs 62 (62A to 62D) which are connected to, for example, dedicated networks 7A and 7B. The external system is not particularly limited and corresponds to, for example, a security system which will be described later.

The overview of the information processing system according to an embodiment of the present disclosure has been described above. Next, basic configurations of the information processing server 1 and the road reflecting mirror type camera (client) 2 included in the information processing system according to the present embodiment will be described. In the following description, the road reflecting mirror type camera 2 is referred to as a "client 2."

<<2. Basic configuration>>
<2-1. Configuration of Information Processing Server>

Figure 2:
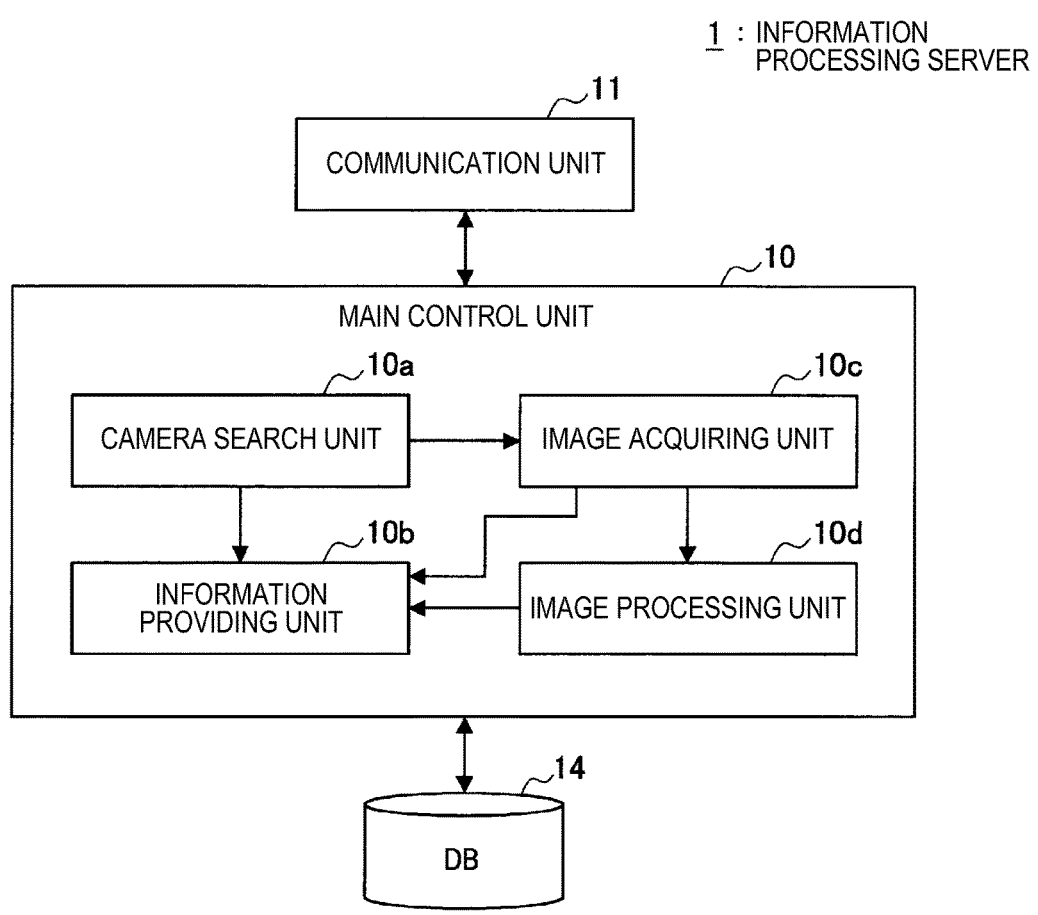
FIG. 2 is a block diagram illustrating an example of a configuration of an information processing server according to the present embodiment.

FIG. 2 is a block diagram illustrating an example of a configuration of the information processing server 1 according to the present embodiment. As illustrated in FIG. 2, the information processing server 1 includes a main control unit 10, a communication unit 11, and a DB 14.

(Main Control Unit 10)

The main control unit 10 is configured with, for example, a microcomputer including a central processing unit (CPU), a Read Only Memory (ROM), a random access memory (RAM), a non-volatile memory, and an interface unit, and controls the respective components of the information processing server 1. For example, the main control unit 10 transmits an image acquisition request to the client 2 located around the user through the communication unit 11 based on current position information of the user transmitted from a user terminal 4. More specifically, the main control unit 10 also functions as a camera search unit 10a, an information providing unit 10b, an image acquiring unit 10c, and an image processing unit 10d as illustrated in FIG. 2.

Camera Search Unit

The camera search unit 10a searches for the client 2 (an example of an imaging device) located around the user terminal 4 (an example of a specific information processing device). Specifically, for example, the camera search unit 10a searches for the client 2 located in a traveling direction of the user or the client 2 located in a direction the user is facing based on current position information or posture information (direction) received from the user terminal 4 with reference to map information indicating an installation position of the client 2 stored in the DB 14. The camera search unit 10a outputs a search result to the information providing unit 10b or/and the image acquiring unit 10c.

Information Providing Unit

The information providing unit 10b provides and information related to the client 2 searched for by the camera search unit 10b and an angle of view of the client 2 to the user terminal 4. Specifically, for example, the information providing unit 10b provides information such as installation position information of the client 2 (two-dimensional (2D) or three-dimensional (3D) position information), a photographing direction, and an angle of view to the user terminal 4. Thus, the user can select an arbitrary desired client 2 based on the installation position of the clients 2 located around the user, the photographing direction, and the like which are presented through the user terminal 4.

Further, the information providing unit 10b may provide a captured image of the client 2 acquired by the image acquiring unit 10c or image processing information (an analysis result) of the image processing unit 10d to the user terminal 4.

Image Acquiring Unit

The image acquiring unit 10c transmits the image acquisition request to the client 2, and acquires the captured image (moving image) imaged by the client 2 in real time. Specifically, the image acquiring unit 10c transmits the image acquisition request to the client 2 selected by the user, and acquires the captured image from the client 2. The image acquiring unit 10c may transmit the image acquisition request to the client 2 located at a position closest to the user among the clients 2 searched for by the camera search unit 10a until a selection is made by the user and acquire the captured image. The captured image acquired by the image acquiring unit 10c is provided to the user terminal 4 through the information providing unit 10b.

Image Processing Unit

The image processing unit 10d performs image processing on the captured image acquired by the image acquiring unit 10c of the client 2, and obtains a predetermined analysis result. For example, the image processing unit 10d can perform traffic safety hazard prediction by performing a mobile object detection process on the captured image or perform security hazard prediction by performing a face recognition process. The image processing information (the analysis result) output from the image processing unit 10d is provided to the user terminal 4 through the information providing unit 10b.

(Communication Unit 11)

The communication unit 11 is connected with an external device in a wired or wireless manner and has a function of transmitting and receiving data. For example, the communication unit 11 according to the present embodiment is connected with the user terminal 4 and receives the current position information or the like and transmits the captured image. The communication unit 11 is connected with the client 2 and receives the captured image.

(DB 14)

The DB 14 is a database that stores various kinds of information. For example, the DB 14 stores the map information indicating the installation position of the client 2 which is connected with the information processing server 1 via the network 3.

<2-2. Configuration of Client>

The client 2 is an example of the imaging device, and in the present embodiment, for example, a road reflecting mirror type camera in which a camera is installed in a road reflecting mirror is used as illustrated in FIG. 1. Here, commonly, the road reflecting mirror provides a blind spot which is not directly visible to a pedestrian or a driver at an intersection or the like, and reflects light by a mirror and enables viewing of an image of a target at a position at which a target to be viewed is originally not able to be seen. However, distortion or a ghost image of sunlight may occur in an image reflected by a reflecting mirror installed in a passage. Further, there are problems in that even when a position or a direction of a mirror that provides a blind spot is appropriately adjusted, a viewed form changes according to a relative position with respect to a position at which the user views or a direction in which the user views, and thus it may be difficult to appropriately provide a blind spot, whether or not a blind spot is dangerous may need to be determined by the user even when a blind spot is viewed, or the user may not notice a road reflecting mirror and not detect a hazard.

As described above, even when the road reflecting mirror is appropriately installed, determination based on direct viewing by the user is necessary for final hazard avoidance. Regarding an operation of the road reflecting mirror, there are problems in that the road reflecting mirror or an installation space thereof is used only for providing a blind spot, and it takes a time to determine an operation state such as a reduction in a function associated with a failure or contamination.

In this regard, in the present embodiment, the road reflecting mirror is provided with an imaging function, and thus it is possible to photograph clearer blind spot information at an appropriate position or an arbitrary position and provide the blind spot information, and thus it is possible to improve a recognition accuracy of a blind spot such that it becomes higher than in the related art and reduce individual differences in recognition. Further, a plurality of road reflecting mirrors are provided with a communication function and managed by the information processing server 1, and thus it is possible to manage the operation state thereof in real time. Further, by analyzing the captured image acquired by the road reflecting mirror, it is possible to provide a value-added service, and the road reflecting mirror or the installation space thereof is effectively used.

Figure 3:
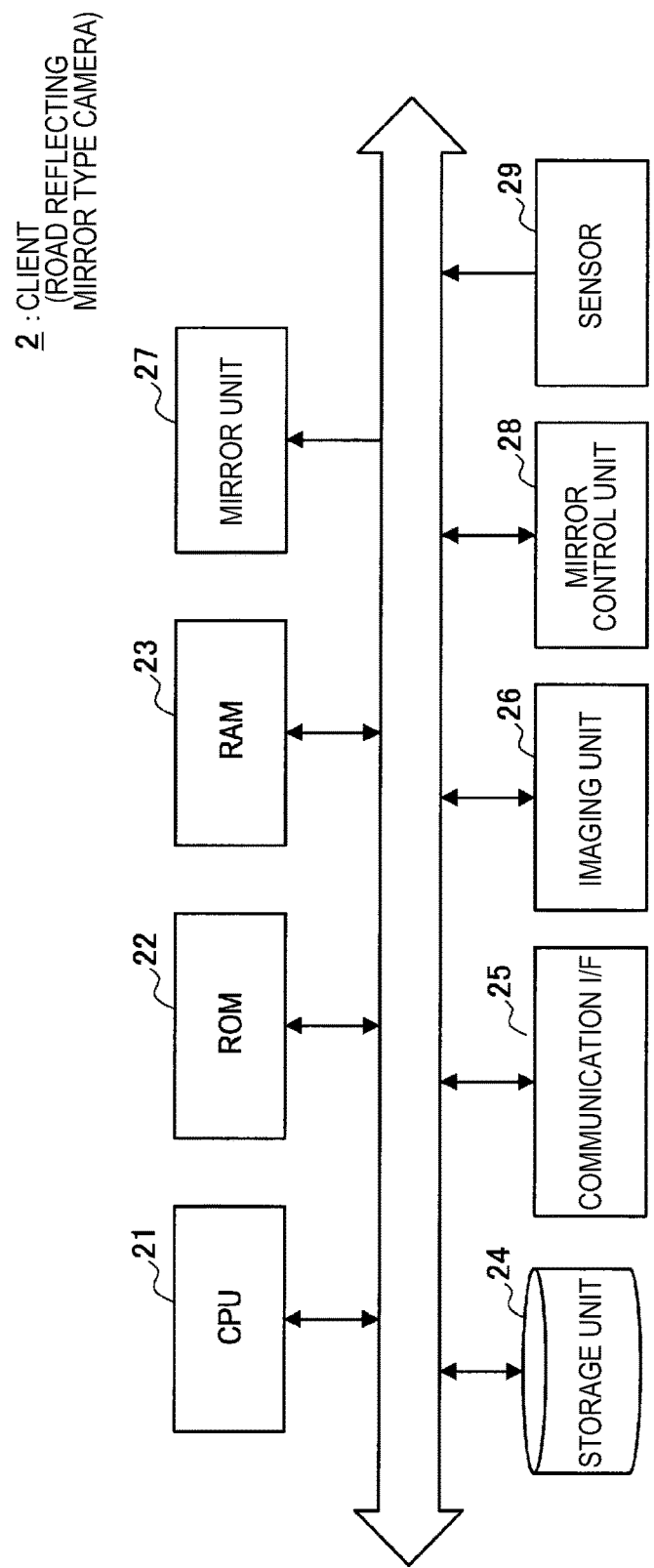
FIG. 3 is a block diagram illustrating an example of a configuration of a client (a road reflecting mirror type camera) according to the present embodiment.

A configuration of the client 2 according to the present embodiment implemented by the road reflecting mirror having such an imaging function will be described below with reference to FIG. 3. FIG. 3 is a block diagram illustrating an example of a configuration of the client 2 (the road reflecting mirror type camera) according to the present embodiment.

As illustrated in FIG. 3, the client 2 includes a CPU 21, a ROM 22, a RAM 23, a storage unit 24, a communication interface (I/F) 25, an imaging unit 26, a mirror unit 27, a mirror control unit 28, and a sensor 29.

(CPU)

The CPU 21 is configured with, for example, a microcomputer and controls the respective components of the client 2. For example, the CPU 21 performs imaging control of the imaging unit 26 according to a control signal transmitted from the server 1 through the communication I/F 25.

(ROM and RAM)

The ROM 22 stores a program or control data such as operation parameters which are used by the CPU 21. The RAM 23 temporarily stores, for example, a program executed by the CPU 21 or the like.

(Storage Unit)

The storage unit 24 stores various data. For example, the storage unit 24 can also temporarily store an image imaged by the imaging unit 26.

(Communication I/F)

The communication I/F 25 is a communication unit included in the client 2, and performs communication with the external device included in the information processing system according to the present embodiment via the network 3 (or directly). For example, the communication I/F 25 is wirelessly connected with the information processing server 1, and transmits the captured image.

(Imaging Unit)

The imaging unit 26 includes a lens system configured with an imaging lens, a diaphragm, a zoom lens, a focus lens, and the like, a driving system that performs a focus operation or a zoom operation on the lens system, a solid-state imaging element array that performs photoelectric conversion on imaging light obtained by the lens system and generates an imaging signal, and the like. The solid-state imaging element array may be implemented by, for example, a charge coupled device (CCD) sensor array or a complementary metal oxide semiconductor (CMOS) sensor array.

Further, the imaging lens is installed on the back of the mirror unit 27 and able to image a surrounding area through the mirror unit 27 of a transmissive or semi-transmissive state.

Further, in order to image a blind spot through a small number of imaging elements or image a wide range, an actuator that performs posture control of the imaging lens, a lens device, and the imaging element may be installed.

(Mirror Unit)

The mirror unit 27 enables the user to view a blind spot, and reflects light through a mirror and enables viewing of an image of a position which the user originally was unable to view. Here, the mirror unit may be a mechanical or electronic shutter or a switchable mirror. For example, in the case in which the mirror unit employs a switching mirror structure including a micro mirror array, an actuator, and a surface protection case, when activated in a deep sleep shutdown state, control is performed by the actuator such that switching from a reflective state to a transmissive state is performed, and when transition from a system operation mode to the deep sleep mode or shutdown state is performed, switching to the reflective state is performed, the state is latched without change, and a state in which there is no electric driving is held, and thus even when there is some kind of abnormality at the time of next activation, it can be stopped in a safe state.

(Mirror Control Unit)

The mirror control unit 28 performs control such that the switchable mirror transitions from the reflective state (non-transmissive) to the transmissive state as described above. Further, as transition to the semi-transmissive state is performed, the mirror is brought into a state in which imaging by the imaging unit 26 is also possible in the reflective state without change. The mirror control unit 28 performs control such that the mirror unit 27 enters the transmissive or semi-transmissive state while imaging by the imaging unit 26 is mainly being performed.

(Sensor)

The client 2 according to the present embodiment may further include various kinds of sensor. The sensors 29 are various kinds of sensor that detect, for example, vibration, a sound, temperature, humidity, luminance, electromagnetic waves (ultraviolet rays, infrared rays, radio waves, or the like) and can provide information that is not obtained from image processing by adding a detection result to an image imaged by the imaging unit 26 and transmitting a resulting image to the server 1. For example, even when a resolution of an imaging element is low or sensitivity is insufficient, in the information processing server 1, regarding a mobile object that is recognized through an image, information from an infrared sensor may be superimposed, and thus it is possible to determine whether or not a target is a living object (more specifically, whether a target is a person or a vehicle), and it is possible to recognize up to a hazard level of an approaching living object for the user.

The respective components of the client 2 have been described above. Here, although not illustrated in FIG. 3, the client 2 may include a power supply unit. The power supply unit may include a power storage element such as a primary battery, a capacitor, or a secondary battery in addition to an AC power source or a DC power source supplying power. The power storage element may be used for the purpose of rectification at the time of electric power fluctuation or may be used as a backup power supply at the time of emergency such as a UPS power supply. Further, electric power may be supplied from a power generation element that generates electric power by a far electromagnetic field from electromagnetic waves (ultraviolet rays, infrared rays, visible rays, radio waves, or the like), a near electromagnetic field such as electromagnetic field induction, a temperature difference, wind power, machine vibration, an enzyme reaction, or the like.

<2-3. Supplement>

The configurations of the server 1 and the client 2 are examples, and the present disclosure is not limited thereto, and for example, all or several components of the server 1 may be installed in the client 2.

Further, the user terminal 4 that receives information provided from the information processing server 1 may be implemented, for example, by a smart phone terminal, a tablet terminal, a mobile phone terminal, a personal digital assistant (PDA), a personal computer (PC), a portable music player, a portable games machine, a wearable terminal (a head mounted display (HMD), a glasses-type HMD, a clock-type terminal, a band type terminal, or the like).

More specifically, the user terminal 4 includes an operation input function and a display function. Specifically, the operation input function is implemented by a touch sensor that receives an operation input onto a display screen. The display function is implemented by, for example, a liquid crystal display (LCD), organic light-emitting diodes (OLED), or the like.

Further, the user terminal 4 includes a position information acquiring unit and detects a current position of the user terminal 4 based on an acquisition signal from the outside. The position information acquiring unit is implemented by, for example, a global positioning system (GPS) unit, and receives radio waves from GPS satellites and detects the position at which the user terminal 4 is located. The position information acquiring unit may detect a position through, for example, Wi-Fi (registered trademark), transmission and reception with a mobile phone, a PHS, or a smart phone, near field communication (NFC), or the like in addition to GPS.

<<3. EMBODIMENTS>>

The information processing system having the above-described configuration assists more comfortable and safer living by providing a video acquired by the road reflecting mirror type camera (the client 2) or an analysis result thereof in real time in response to a request from the user present therearound. A specific example of details of assistance by the information processing system will be described with reference to a plurality of embodiments to be described below.

<3-1. First Embodiment>

In a first embodiment, an information processing system in which a video acquired by the road reflecting mirror type camera (the client 2) located around the user is provided to the user in real time, and thus remote vision for an arbitrary place is implemented, and more comfortable living is assisted will be described.

Figure 4:
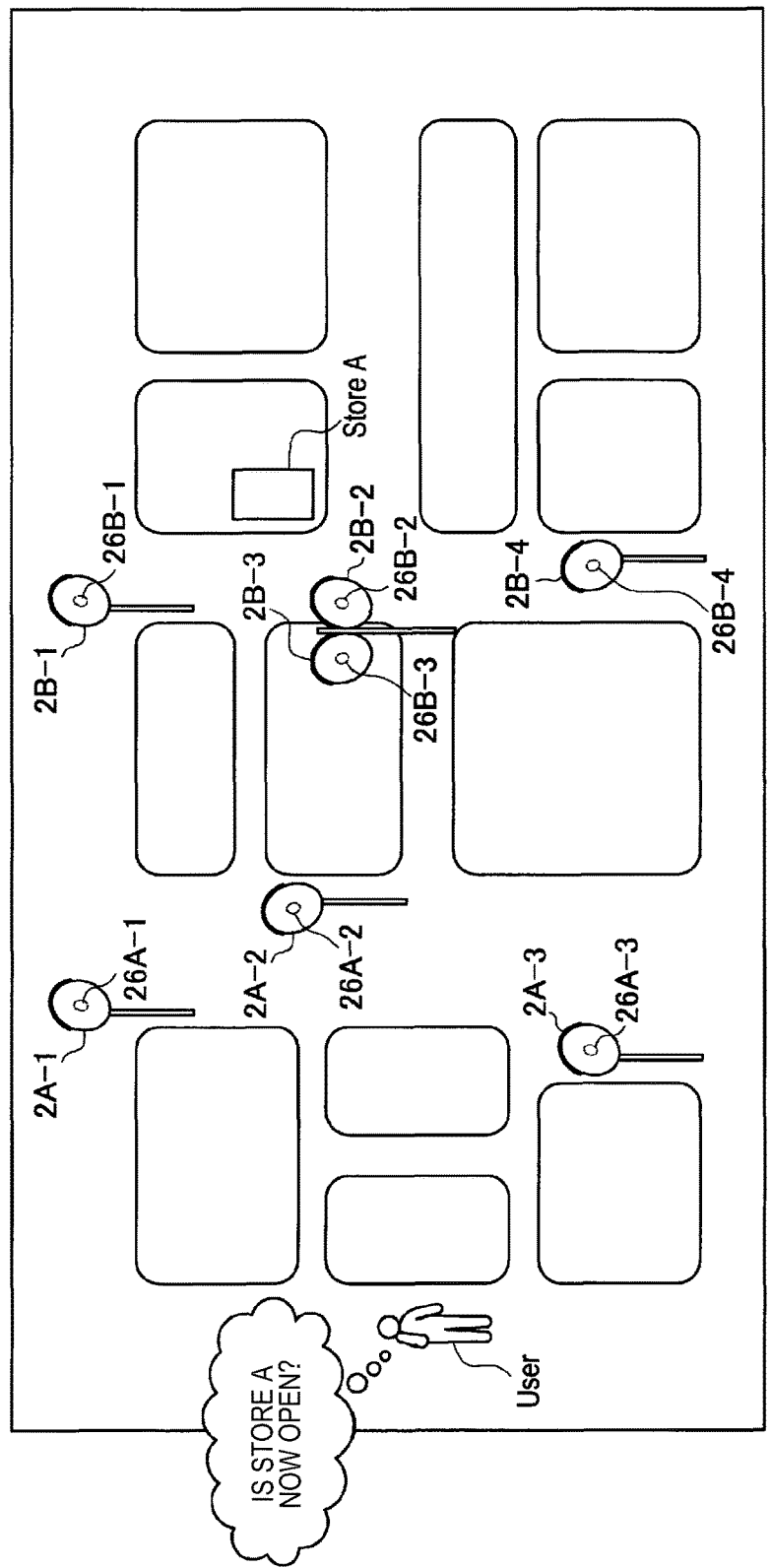
FIG. 4 is a diagram for describing an overview of an information processing system according to a first embodiment.

FIG. 4 is a diagram for describing an overview of an information processing system according to the first embodiment. When it is possible to provide an image imaged by the imaging unit 26 to the user in real time in a situation in which a plurality of clients 2 (2A-1 to 2A-3 and 2B-1 to 2B-3) are installed on a street as illustrated in FIG. 4, the user can check a current state of a place that is not viewed, and thus convenience is improved.

For example, when the user desires to check a current state of a store A which is positioned a short distance away (for example, whether a stores is currently empty or crowded) while the user is out, if an image imaged by the client 2B-1 is provided in real time, the user can view the current state without going to the store A.

Figure 5:
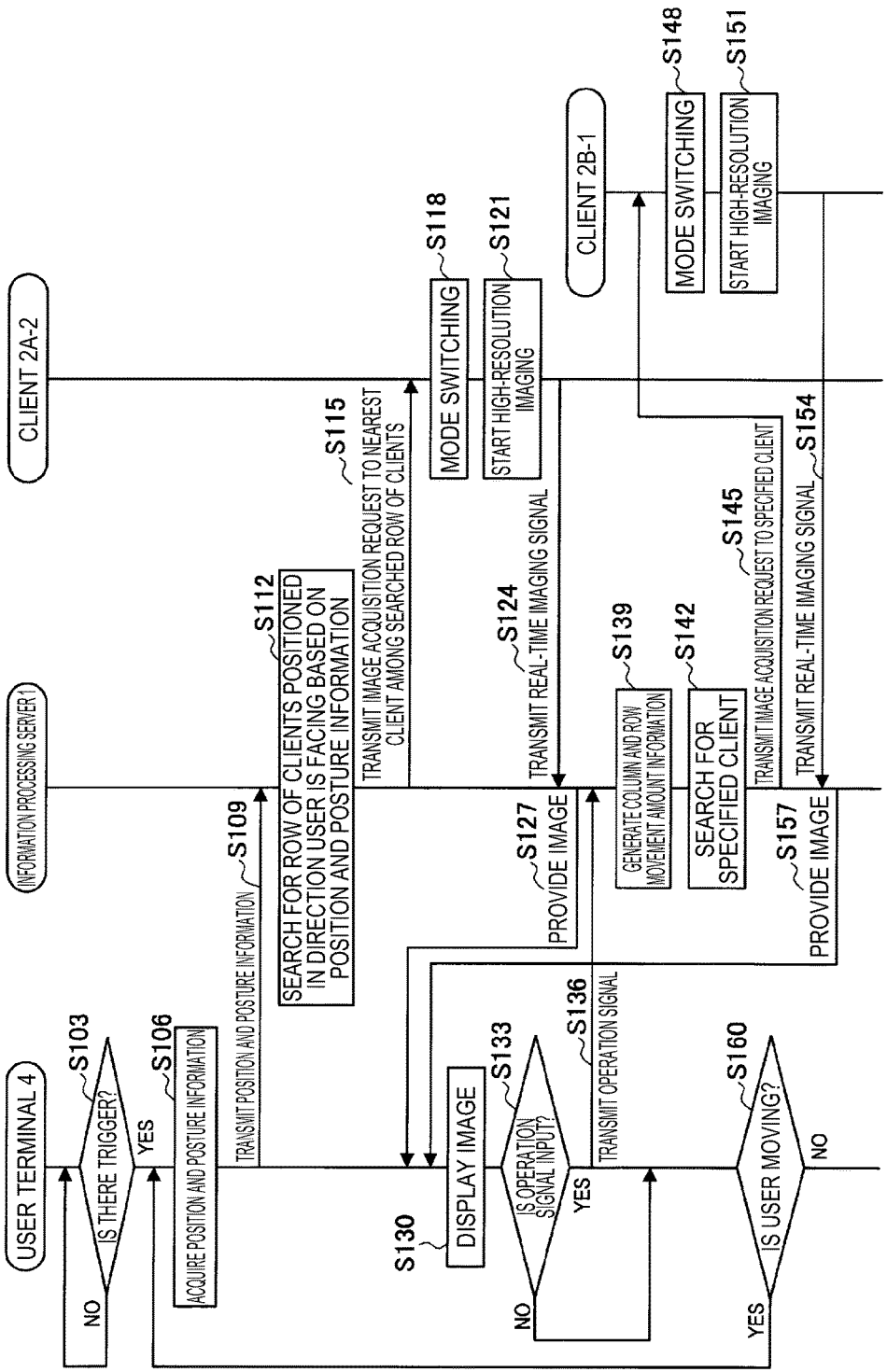
FIG. 5 is a sequence diagram illustrating an example of an image provision process according to the first embodiment.

Next, an operation process according to the first embodiment will be described with reference to FIG. 5. FIG. 5 is a sequence diagram illustrating an example of an image provision process according to the first embodiment.

As illustrated in FIG. 5, first, in step S103, the user terminal 4 detects the presence or absence of a trigger. For example, the trigger may be a system activation instruction operation by the user (a button operation, a gesture, a voice input, or the like) or movement of the user into a predetermined range in which the system can be provided.

Then, when the trigger is detected (Yes in S103), in step S106, the user terminal 4 acquires the current position and the posture information of the user terminal 4. For example, the current position is acquired by the GPS installed in the user terminal 4, and the posture information is acquired by a gyro sensor, a geomagnetic field sensor, or the like installed in the user terminal 4.

Then, in step S109, the user terminal 4 transmits the acquired current position information and the posture information to the information processing server 1.

Figure 6:
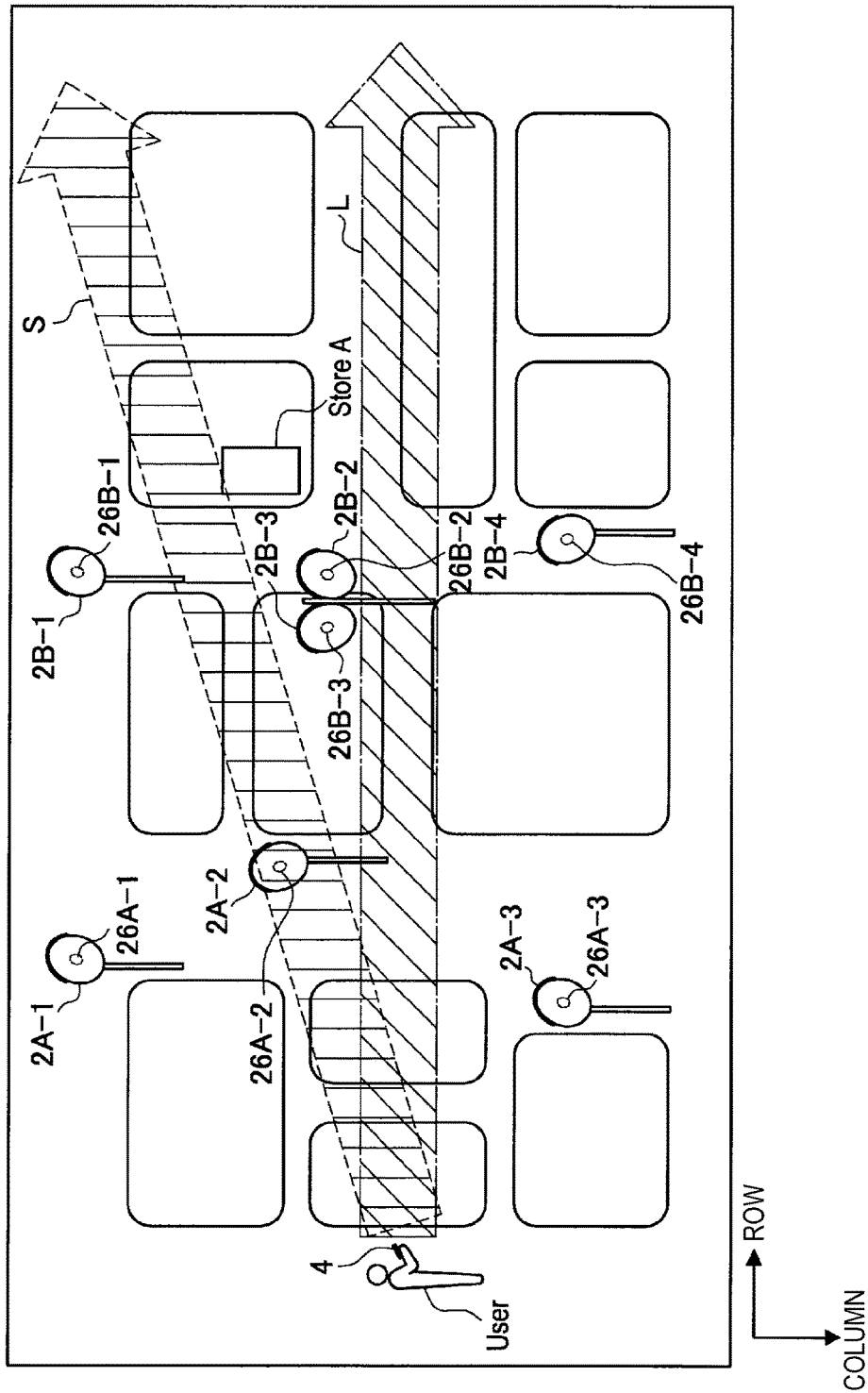
FIG. 6 is a diagram illustrating an example of map information which is referred to when a search process according to the first embodiment is performed.

Then, in step S112, the camera search unit 10*a* of the information processing server 1 searches for a row of clients positioned in a direction the user is facing based on the current position information and the posture information. More specifically, as illustrated in FIG. 6, the camera search unit 10*a* estimates the position of the user and the direction the user is facing based on the current position information and the posture information acquired by the user terminal 4, and searches for a column of clients positioned in a direction L the user is facing with reference to the map information stored in the DB 14. Here, in the map information referred to by the camera search unit 10*a*, a vertical direction is referred to as "column," and a transverse direction is referred to as "row" as illustrated in FIG. 6. Thus, in the map information illustrated in FIG. 6, the camera search unit 10*a* searches for the clients 2A-2, 2B-2, and 2B-3 as a column of clients positioned in the direction L the user is facing. At this time, clients positioned on a straight line are set as a search target with no consideration of the presence or absence of buildings in the direction the user is facing.

Then, in step S115, the information processing server 1 transmits the image acquisition request to the nearest client 2A-2 at the position closest to the user among the searched for clients 2.

Then, in step S118, the client 2A-2 performs mode switching. Specifically, the client 2A-2 performs switching from the deep sleep mode (standby mode) or the shutdown state in which no captured image is acquired to the system operation mode (specifically, a high-resolution imaging mode).

Then, in step S121, the client 2A-2 starts high-resolution imaging through the imaging unit 26A-2.

Then, in step S124, the client 2A-2 continuously transmits the captured image (video) to the information processing server 1 in real time.

Then, in step S127, the information processing server 1 transmits and provides the captured image transmitted from the client 2A-2 to the user terminal 4. At this time, the information processing server 1 may transmit information related to the installation position or an angle of view of the client 2A-2 together therewith based on the map information or information acquired from the client 2A-2.

Then, in step S130, the user terminal 4 displays the captured image transmitted from the information processing server 1. Further, the user terminal 4 displays an image indicating the position or an angle of view of the client 2A-2 that has acquired the captured image as necessary.

Then, in step S133, the user terminal 4 receives an input of an operation signal for instructing client switching (movement of a target client). In other words, through the process of S130, the user can view a current state of a road at an opposite side in which a building is not viewed at a distance from a current position, but since such an image is acquired by the client 2A-2 positioned to be closest among a searched row of clients, such an image may not be an image of a desired place. In this case, the user can give an instruction to switch a client (move a target client).

Various methods may be used as a switching instruction method. For example, an instruction to perform a search in a different direction may be given by changing a direction of the user terminal 4 and changing a posture, or a switching instruction may be given by a line of sight, a brain wave, or a gesture.

Further, the switching instruction may be given using a band type information processing terminal that detects motion of an arm of the user. The band type information processing terminal includes a gyro sensor, a geomagnetic field sensor, an acceleration sensor, or the like, and detects rotation of the arm or motion of the arm in an up, down, left, or right direction when it is worn on the arm of the user and transmits a detection result to the user terminal 4. The switching instruction using the band type information processing terminal will be described below with reference to FIGS. 7 to 9.

FIG. 7 is a diagram for describing an operation of instructing client movement and zoom-in/out in a row direction. As illustrated in FIG. 7, for example, when a band terminal 8 is worn on the left wrist of the user, an instruction to move in the row direction (see FIG. 6) may be given by rotating the band terminal 8 clockwise when viewed from the user, and an instruction to return in the row direction may be given by rotating the band terminal 8 counterclockwise when viewed from the user. The operation input by rotating the band terminal 8 left and right may be used for a zoom-in/out operation of a displayed captured image in addition to forward and backward movement in the row direction.

Figure 8:
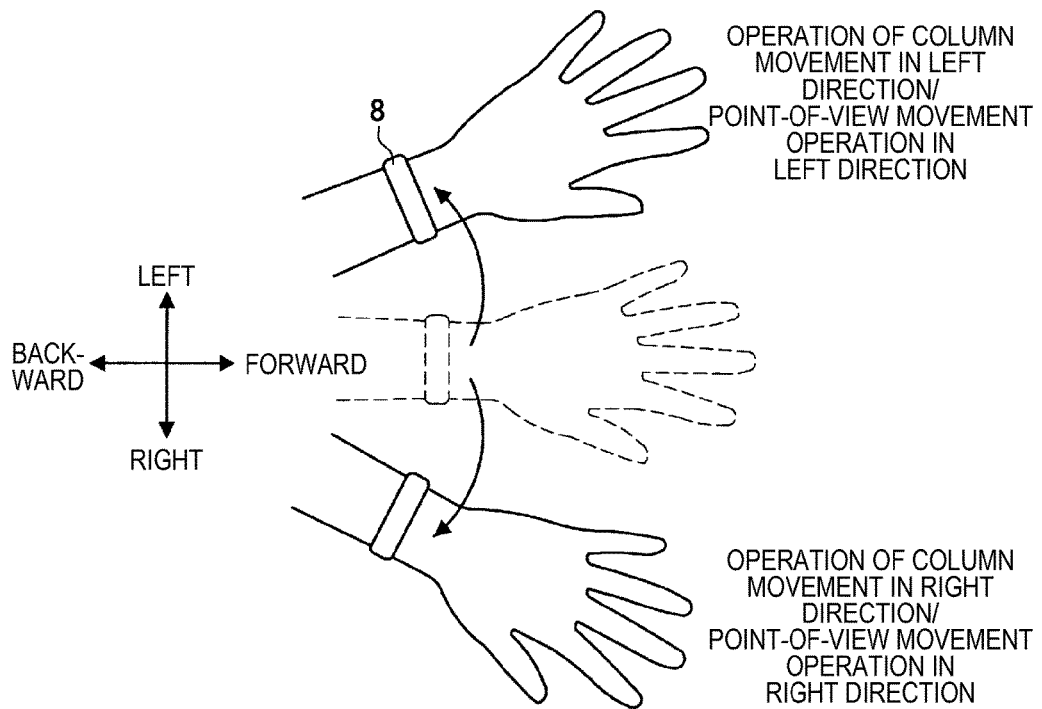
FIG. 8 is a diagram for describing an operation of instructing client movement and point-of-view movement in a column direction.

FIG. 8 is a diagram for describing an operation of instructing client movement and point-of-view movement in a column direction. As illustrated in FIG. 8, when the band terminal 8 is worn on the left wrist of the user, an instruction to perform column movement in the right direction may be given by moving the band terminal 8 right when viewed from the user, and an instruction to perform column movement in the left direction may be given by returning the band terminal 8 left when viewed from the user. The operation input by moving the band terminal 8 left and right may be used when a point of view of a displayed captured image is moved in the crosswise direction in addition to column movement.

Figure 9:
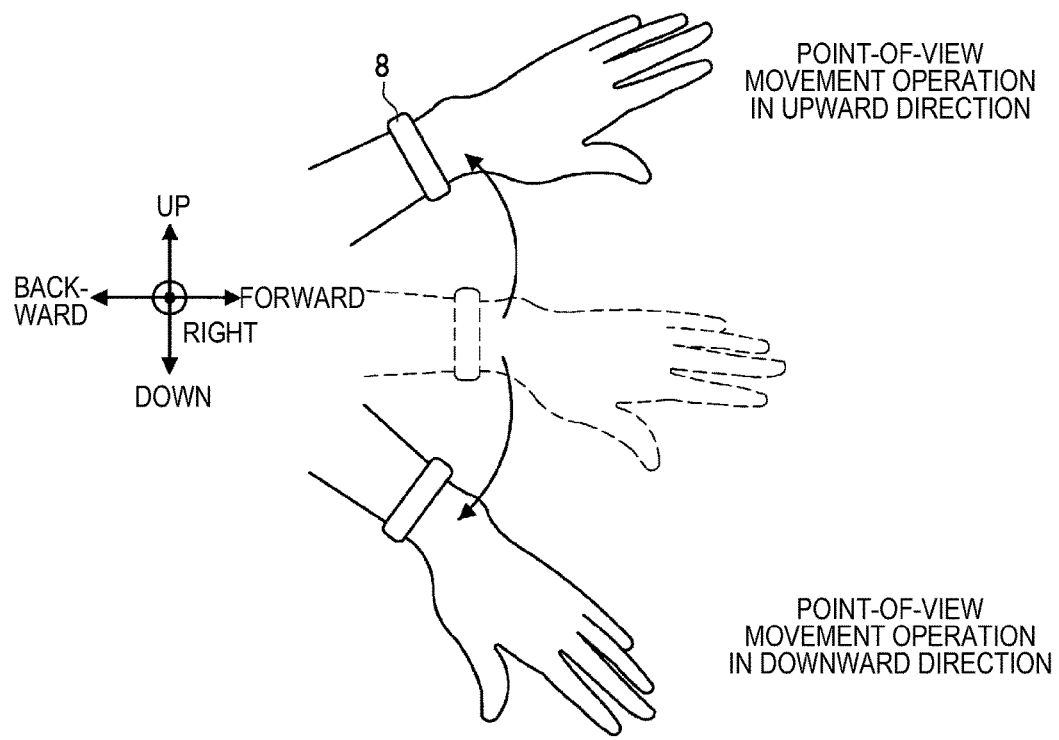
FIG. 9 is a diagram for describing an operation of instructing point-of-view movement in a vertical direction.

FIG. 9 is a diagram for describing an operation of instructing point-of-view movement in a vertical direction. As illustrated in FIG. 9, when the band terminal 8 is worn on the left wrist of the user, an instruction to perform point-of-view movement in an upward direction may be given by turning the band terminal 8 to face up, and an instruction to perform point-of-view movement in a downward direction by turning the band terminal 8 to face down.

When the above-described operation signal for instructing the client switching is input (Yes in S133), in step S136, the user terminal 4 transmits the input operation signal to the information processing server 1.

Then, in step S139, the camera search unit 10*a* of the information processing server 1 generates column and row movement amount information based on the received operation signal, and in step S142, the camera search unit 10*a* searches for a specified client. For example, when an operation signal for instructing one-block movement in the row direction and an operation signal for instructing column movement in the left direction are input, the camera search unit 10*a* moves one block from the client 2A-2 which is currently specified in the row direction and searches for the client 2B-1 positioned in a left direction S which is instructed by the user as illustrated in FIG. 6.

Then, in step S142, the information processing server 1 transmits the image acquisition request to the searched specified client 2B-1.

Then, in steps S148 to S157, a similar process to S118 to S127 is performed, and in step S130, the user terminal 4 displays the captured image imaged by the client 2B-1 in real time. Thus, the user can check the current state of the store A included in the image imaged by the client 2B-1.

As described above, the user can arbitrarily switch a client that provides a video to be viewed.

Figure 10:
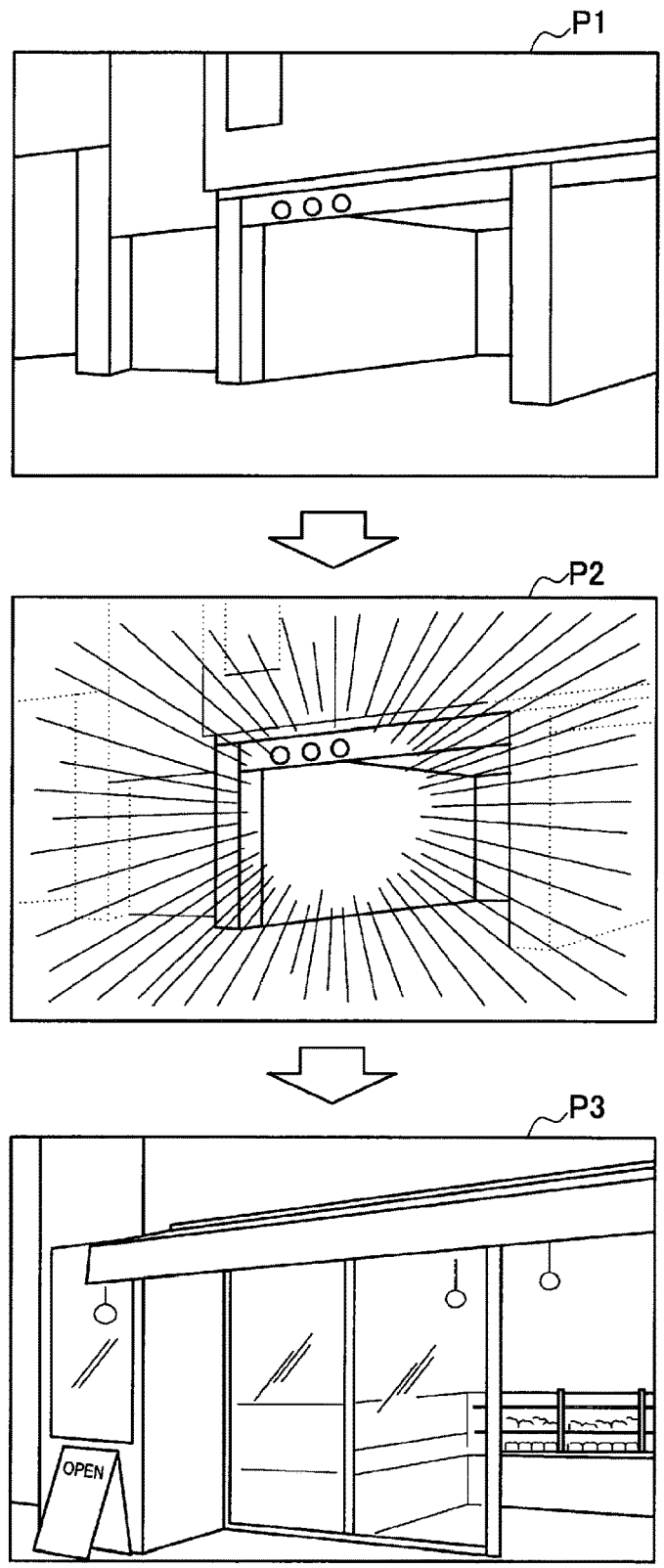
FIG. 10 is a diagram for describing an effect process when a specified client is switched, and a display image is updated.

When the specified client is switched from the client 2A-2 to the client 2B-1, and the captured image displayed on the user terminal 4 is updated, the information processing server 1 may perform display control such that switching is performed with an effect-processed image interposed therebetween. For example, when switching from an image P1 imaged by the client 2A-2 to an image P3 imaged by the client 2B-1 is performed as illustrated in FIG. 10, display control may be performed such that switching is performed while interposing the effect image P2 that has undergone an effect process of giving a feeling that the user who is viewing moves while passing through a road and a building.

Further, in a display screen in the user terminal 4, the captured image imaged by the client 2 is displayed in real time, but the map information may be additionally presented to indicate the position of the user and the position of the specified client in the map information. This will be described with reference to FIG. 11.

Figure 11:
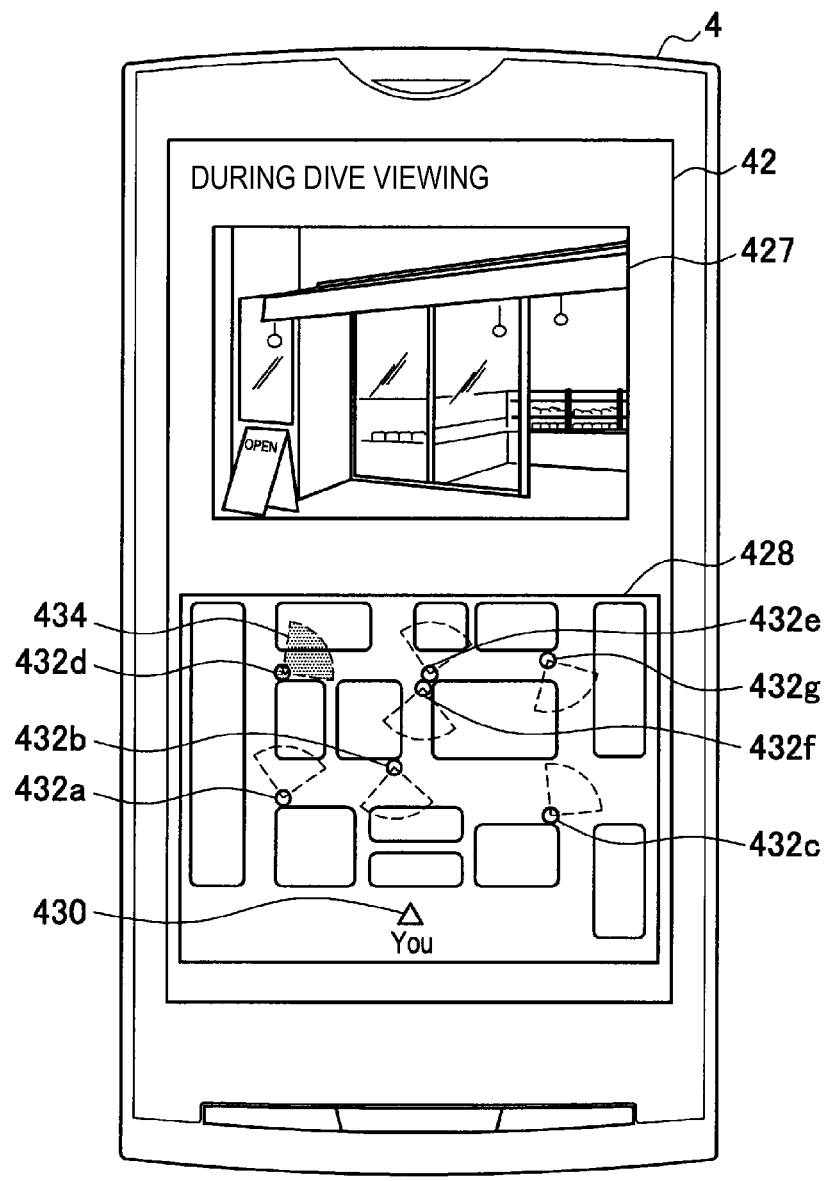
FIG. 11 is a diagram illustrating an exemplary display image according to the first embodiment.

As illustrated in FIG. 11, a captured image 427 (video) imaged by the client 2 is displayed on a display unit 42 of the user terminal 4, and a map image 428 is displayed in a lower portion of the display unit 42. In the map image 428, a current position icon 430 indicating a current position of the user and client icons 432*a* to 432*g* indicating positions of a plurality of clients 2 are mapped. An angle-of-view region 434 indicating an angle of view (a photographing direction and a photographing range) of each client 2 is also displayed. Thus, the user can intuitively understand a position and an angle of view of each client 2. The client 2 that has acquired the captured image 427 which is currently displayed is marked, for example, such that its color on a map is changed.

At this time, the user can perform the operation input (S133) of the client switching instruction by tapping and selecting any one of the client icons 432*a* to 432*e* on the map. The user terminal 4 instructs the information processing server 1 so that switching to the tapped client icon 432 is performed.

Further, in step S160, the user terminal 4 determines whether or not the user is moving, and when the user is determined to be moving (Yes in S160), the user terminal 4 causes the process to return to step S106 and transmits the current position information and the posture information to the information processing server 1.

Further, in S139 and S142, when the operation signal is the zoom-in/out, the point-of-view movement in the right/left direction, or the point-of-view movement in the upward/downward direction, the information processing server 1 instructs the imaging unit 26 of the specified client 2 to perform the zoom-in/out, the point-of-view movement in the right/left direction, or the point-of-view movement in the upward/downward direction. Thus, the imaging unit 26 is driven according to the instruction, and performs the zoom-in/out operation or the like. The zoom-in/out operation or the like is not limited to a mechanical operation by the imaging unit 26 and may be image processing by the image processing unit 10*d* of the information processing server 1. In other words, when some images imaged at a wide angle by the imaging unit 26 of the client 2 are provided to the user terminal 4, a target image is extracted by image processing in response to the zoom-in/out operation or the like.

The above-described first embodiment has been described under the assumption that, when a search is performed by the camera search unit 10*a* of the information processing server 1, the client 2 is seen within the target range, but the client 2 may not be seen within the target range. This case will be described with reference to FIG. 12.

Figure 12:
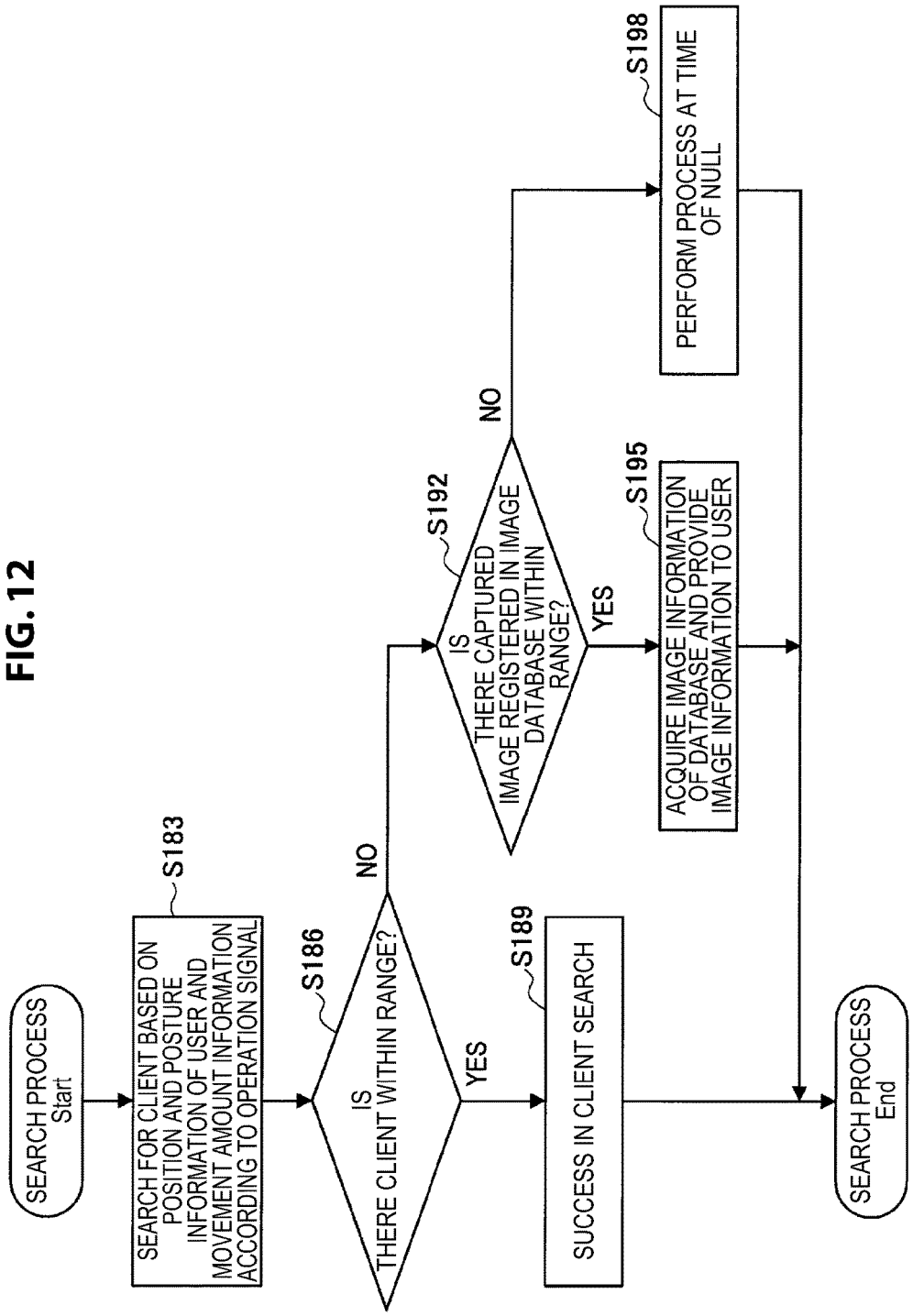
FIG. 12 is a flowchart illustrating a process of complementing a search process according to the first embodiment.

FIG. 12 is a flowchart illustrating a process of complementing the search process according to the first embodiment. As illustrated in FIG. 12, first, in step S183, the camera search unit 10*a* of the information processing server 1 searches for the client 2 based on the current position information and the posture information of the user and the movement amount information according to the operation signal.

Then, when there is a client within a range (Yes in step S189), in step S189, a client is determined to have been searched for successfully, and the process subsequent to S115 illustrated in FIG. 5 is performed.

On the other hand, when there is no client within a range (No in step S189), in step S192, the camera search unit 10*a* determines whether or not there is a captured image registered in an image database within a range. Here, for example, the camera search unit 10a accesses the server 6 that manages a specialized image database in an external system (FIG. 1), and searches for a captured image previously captured within the range based on the current position information and the posture information of the user and the movement amount information according to the operation signal.

Then, when there is a registered captured image (Yes in step S192), in step S195, the information processing server 1 acquires image information of the image database, and transmits the image information to the user terminal 4 instead of the process of S127 illustrated in FIG. 5.

On the other hand, when there is no registered captured image (No in step S192), in step S198, the information processing server 1 gives a notification indicating that there is no target image to the user as a process at the time of NULL. For example, a black screen, "NULL," or "there is no image" is displayed on the display screen of the user terminal 4.

As described above, when there are no searched for clients 2 within the target range, the present system can be complemented by displaying a previous image. In this case, information indicating that it is a previous image or an imaging date and time may be displayed so that a difference from a real-time image is explicitly indicated.

<3-2. Second Embodiment>

Next, a second embodiment will be described with reference to FIGS. 13 to 15. In the second embodiment, an information processing system in which traffic safety hazard information is extracted based on the video acquired by the road reflecting mirror type camera (the client 2) located around the user and provided to the user, and thus more comfortable living is assisted will be described.

Figure 13:
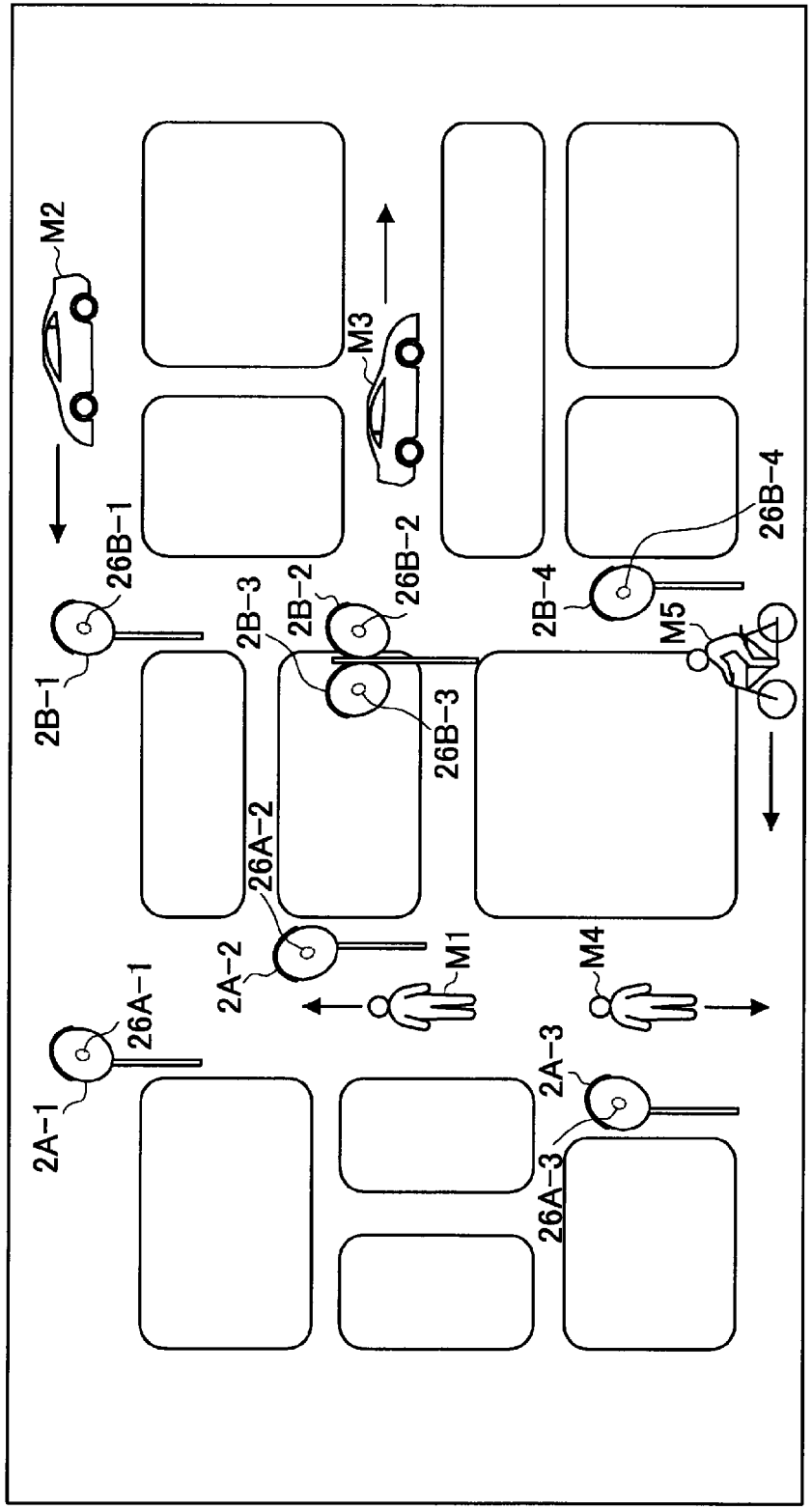
FIG. 13 is a diagram for describing an overview of an information processing system according to a second embodiment.

FIG. 13 is a diagram for describing an overview of the information processing system according to the second embodiment. In a situation in which a plurality of clients 2 (2A-1 to 2A-3 and 2B-1 to 2B-3) are installed on a street as illustrated in FIG. 13, it is possible to analyze the image imaged by the imaging unit 26, detect motion of mobile objects M1 to M4, and predict a hazard of collision or the like. Then, the predicted hazard information is provided to the user, and the user can prevent an accident when distortion or a ghost image of sunlight occurs in an image viewed through the mirror of the road reflecting mirror type camera 2, it is difficult to appropriately check a blind spot depending on a viewing angle, or a hazard is not detected. Further, in recent years, there has been a problem of users operating a smart phone while walking and not noticing hazards therearound, and thus when a hazard notification screen is displayed on the smart phone (the user terminal 4) in an interrupt manner, a hazard can be avoided. Further, there is a problem of users not noticing hazards therearound when walking or riding a bicycle while listening to music using earphones, and thus when a hazard notification is output as a sound from earphones in an interrupt manner, a hazard can be avoided.

Such an operation process of the second embodiment will be described with reference to FIG. 14. FIG. 14 is a sequence diagram illustrating an example of a traffic safety hazard information provision process according to the second embodiment.

Figure 14:
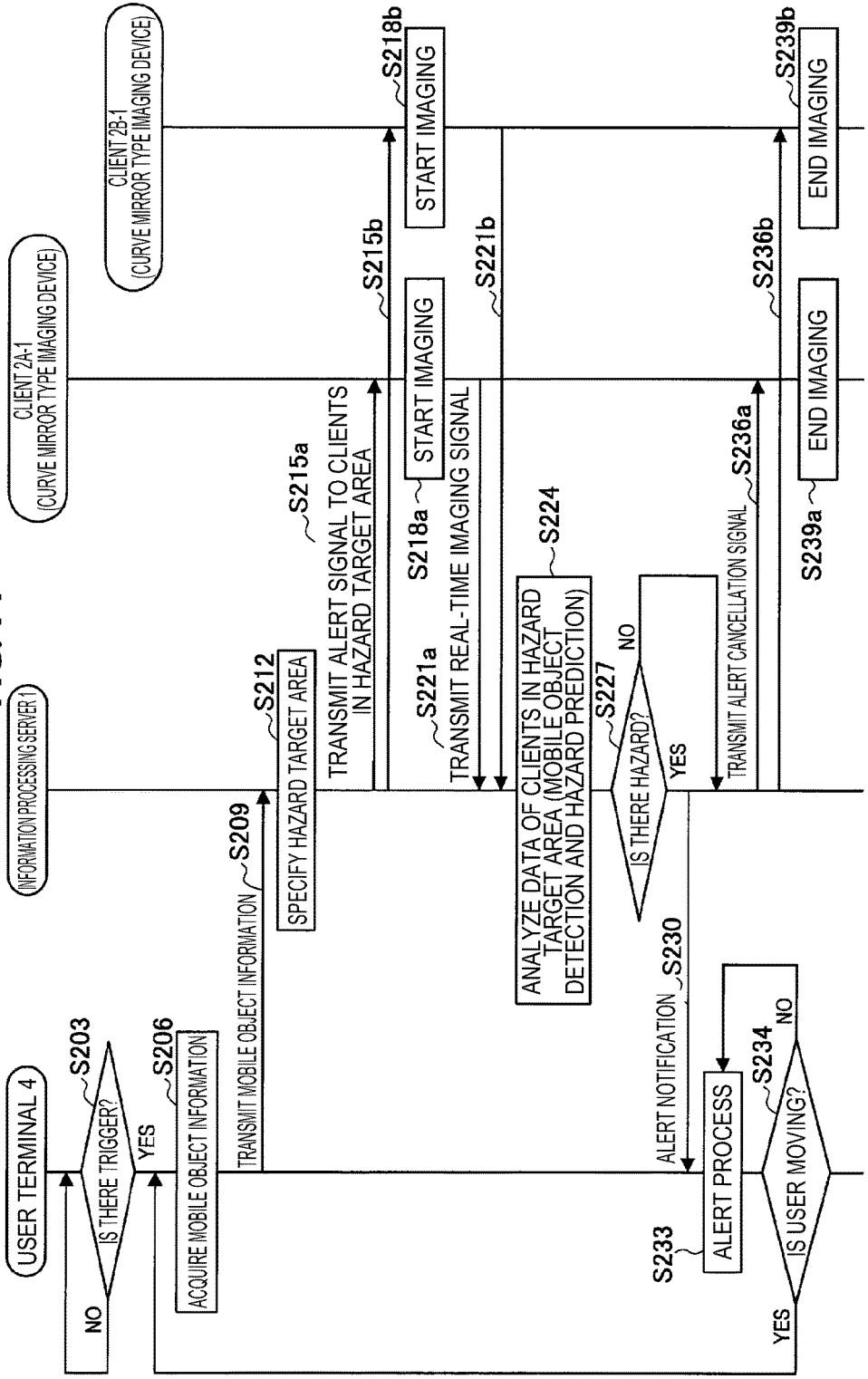
FIG. 14 is a sequence diagram illustrating an example of a traffic safety hazard information provision process according to the second embodiment.

As illustrated in FIG. 14, first, in step S203, the user terminal 4 detects the presence or absence of the trigger. For example, the trigger may be a system activation instruction operation by the user (a button operation, a gesture, a voice input, or the like) or movement of the user into a predetermined range in which the system can be provided.

Then, when the trigger is detected (Yes in S203), in step S206, the user terminal 4 acquires its current position, movement information (a speed and a direction), a mobile object type (a pedestrian, a bicycle, or a vehicle), and the like as mobile object information. For example, the current position may be acquired by the GPS installed in the user terminal 4, and the movement information may be acquired by a gyro sensor, an acceleration sensor, or the like installed in the user terminal 4.

Then, in step S209, the user terminal 4 transmits the acquired mobile object information to the information processing server 1.

Then, in step S212, the camera search unit 10a of the information processing server 1 specifies a hazard target area based on the mobile object information with reference to the map information. For example, in the example illustrated in FIG. 13, when the mobile object information is transmitted from the mobile object M1 (the user; pedestrian), a range illustrated in FIG. 13 centering on the mobile object M1 is specified as the hazard target area.

Then, in step S215, the image acquiring unit 10c of the information processing server 1 transmits the alert signal (including the image acquisition request) to the clients 2 included in the hazard target area. As illustrated in FIG. 13, in the present embodiment, the alert signal can be transmitted to the clients 2A-1 to 2A-3 and 2B-1 to 2B-3, but in a flowchart illustrated in FIG. 14, the alert signal is representatively transmitted to the clients 2A-1 and 2B-1 (S215a and S215a).

Then, in step S218, in response to reception of the alert signal, each of the clients 2 starts imaging by the imaging unit 26 (S218a and S218b), and in step S221, each of the clients 2 continuously transmits the captured images (video) which are imaged to the information processing server 1 in real time (S221a and S221b). In S218, each of the clients 2 transitions from the deep sleep mode (the standby mode) to the system operation mode (specifically, a low-rate imaging mode) and starts imaging.

Then, in step S224, the image processing unit 10d of the information processing server 1 analyzes the captured images received from the clients 2 in the hazard target area, and performs detection of a mobile object and hazard prediction. Specifically, for example, the image processing unit 10d of the information processing server 1 detects the mobile objects M1 to M5 based on the captured images acquired from the clients 2A-1 to 2A-3 and 2B-1 to 2B-3 in the hazard target area. Then, the image processing unit 10d specifies the mobile object M1 who is the user of the present system based on the mobile object information transmitted from the user terminal 4, and detects an object which is likely to collide with the mobile object M1 since it is approaching the mobile object M1 relatively.

At this time, the image processing unit 10d determines whether or not an object approaching the mobile object M1 relatively is a living body based on values of sensors 29 of various kinds such as an infrared sensor which are added to the captured image, extracts the position of the object from the captured image, detects a relative position and a velocity vector, and calculates a possibility of collision. For example, in the example illustrated in FIG. 13, the image processing unit 10d outputs a possibility that the mobile object M1 will collide with the mobile object M2 (the hazard information) based on a position, a moving direction, a moving speed, and a mobile object type (pedestrian) of the mobile object M1 and a position, a moving direction, a speed, and a mobile object type (vehicle) of the mobile object M2

For the mobile object M3, the hazard information is not output based on the moving direction. Further, when the user of the present system is the mobile object M5 (vehicle), a possibility of collision with the mobile object M4 (the hazard information) is output.

Then, when it is determined that there is a hazard (the hazard information is output) (Yes in S227), in step S230, the information processing server 1 gives an alert notification to the mobile object M1 (the user terminal 4).

Then, in step S233, the user terminal 4 performs an alert process in response to the alert notification given from the information processing server 1. As the alert process, various processes may be performed. For example, an alert notification screen may be displayed on the display screen of the user terminal 4 in an interrupt manner, and when music reproduction control is performed through earphones or headphones, an interrupt signal may be mixed with music which is being reproduced to output an alert sound. The user terminal 4 may perform the alert process with a period according to a relative distance to a target object to collide with. Further, attention may be attracted by vibration by a vibration function of the user terminal 4 or display of a display of an eyewear (a glasses-type HMD).

Such alert process details may be customized for each user.

Further, when the user of the present system is the mobile object M2 (vehicle), an alert screen may be displayed on a navigation screen (a display device installed on a windshield or next to a driver seat), or an interrupt signal may be mixed with music which is played in a vehicle to output an alert sound. Further, a brake system of a vehicle (the mobile object M2) connected to a network may be compulsorily controlled and operated according to a level of a degree of hazard.

Further, when the mobile object M2 of the collision subject is registered as the user of the present system, the alert notification may be given to the mobile object M2.

Further, in step S234, the user terminal 4 determines whether or not the user is moving (the user is considered to be changing moving direction or stopping in order to avoid a hazard), and when the user is determined to be moving (Yes in S234), the user terminal 4 causes the process to return to step S206, and newly transmits the mobile object information to the information processing server 1.

On the other hand, when it is determined that there is no hazard (the hazard information is not output) (No in S227), in step S236, the information processing server 1 transmits an alert cancellation signal to the clients 2 in the hazard target area (S236a and S236b).

Then, in step S239, each of the clients 2 that have received the alert cancellation signal ends the imaging by the imaging unit 26 (S239a and S239b). Specifically, each of the clients 2 transitions from the system operation mode to the deep sleep mode (the standby mode) and ends imaging.

(Supplement)

In the above-described embodiment, each of the clients 2 that have received the alert signal performs transition to the low-rate imaging mode and starts imaging, but the present embodiment is not limited thereto. Another operation process will be described below with reference to FIG. 15.

Figure 15:
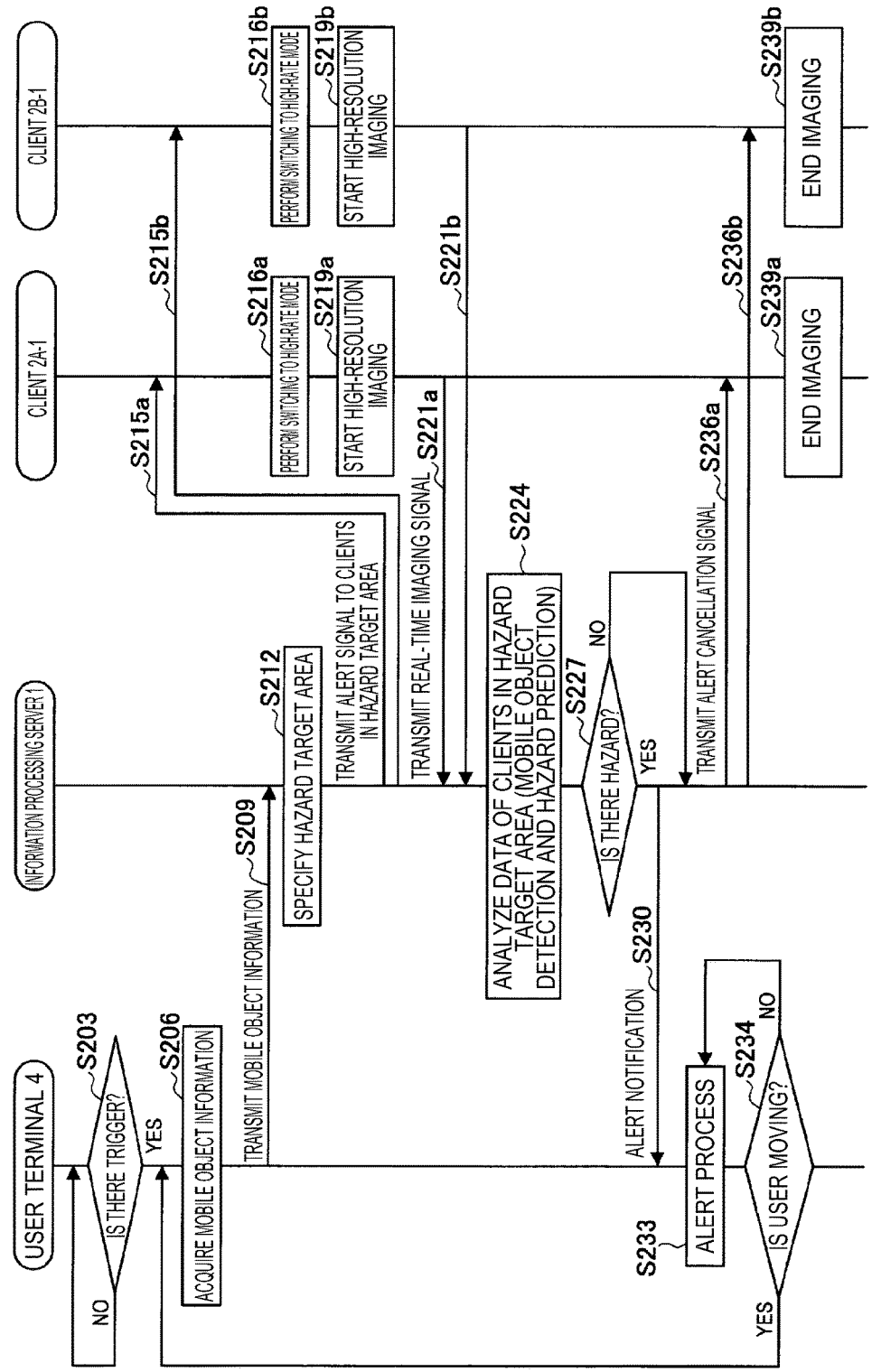
FIG. 15 is a sequence diagram illustrating another example of a traffic safety hazard information provision process according to the second embodiment.

FIG. 15 is a sequence diagram illustrating another example of the traffic safety hazard information provision process according to the second embodiment. In a process illustrated in FIG. 15, a process having the same reference numerals as in the process illustrated in FIG. 14 is similar in details to that of the above embodiment, and thus a specific description is omitted.

Here, in step S216, each of the clients 2 that have received the alert signal from the information processing server 1 performs switching to a high-rate mode (S216a and S216b). In other words, each of the clients 2 performs switching from the deep sleep mode to the high-rate mode in which high-resolution imaging is performed.

Thus, in step S219 subsequent thereto, each of the clients 2 starts the high-resolution imaging through the imaging unit 26 (S218a and S218b).

The supplement of the present embodiment has been described above. Further, each of the clients 2 may perform switching from the deep sleep mode to the low-rate imaging mode when the alert signal is initially received and then may perform switching from the low-rate imaging mode to the high-rate imaging mode when the hazard prediction is calculated in the information processing server 1, and the image acquisition request is made again in order to perform more detailed determination.

<3-3. Third Embodiment>

Next, a third embodiment will be described with reference to FIGS. 16 to 17. In the third embodiment, an information processing system in which security hazard information is extracted based on the video acquired by the road reflecting mirror type camera (the client 2) located around the user and provided to the user, and thus more comfortable living is assisted will be described.

In the second embodiment, in a situation in which a plurality of clients 2 (2A-1 to 2A-3 and 2B-1 to 2B-3) are installed on the street, the image imaged by the imaging unit 26 is analyzed, and a traffic safety hazard is predicted, but the present disclosure is not limited thereto, and for example, it is possible to predict a security hazard.

Such an operation process of the third embodiment will be described with reference to FIG. 16. FIG. 16 is a sequence diagram illustrating an example of a security hazard information provision process according to the third embodiment.

Figure 16:
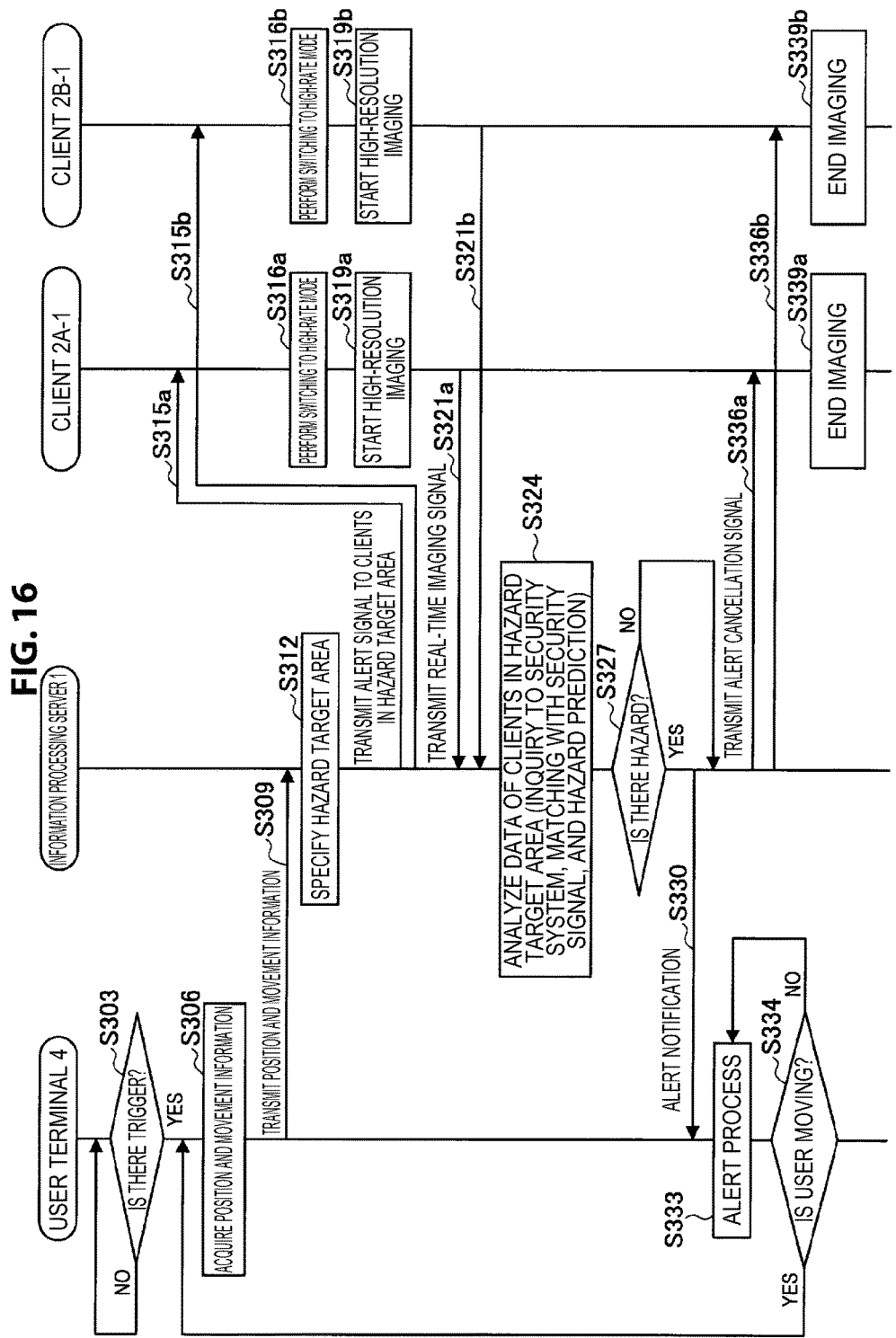
FIG. 16 is a sequence diagram illustrating an example of a security hazard information provision process according to a third embodiment.

As illustrated in FIG. 16, first, in step S303, the user terminal 4 detects the presence or absence of the trigger. For example, the trigger may be a system activation instruction operation by the user (a button operation, a gesture, a voice input, or the like) or movement of the user into a predetermined range in which the system can be provided.

Then, when the trigger is detected (Yes in S303), in step S306, the user terminal 4 acquires the current position, the movement information (a speed and a direction), and the like of the user terminal 4. For example, the current position may be acquired by the GPS installed in the user terminal 4, and the movement information may be acquired by a gyro sensor, an acceleration sensor, or the like installed in the user terminal 4.

Then, in step S309, the user terminal 4 transmits the acquired current position information and the movement information to the information processing server 1.

Then, in step S312, the camera search unit 10a of the information processing server 1 specifies the hazard target area based on the current position and the movement information of the user with reference to the map information.

Then, in step S315, the image acquiring unit 10c of the information processing server 1 transmits the alert signal (including the image acquisition request) to the clients 2 included in the hazard target area (S215a and S215a).

Then, in step S316, each of the clients 2 performs switching to the high-rate imaging mode in response to reception of the alert signal (S316a and S216b), and in step S319, each of the clients 2 performs the high-resolution imaging by the imaging unit 26 (S319a and S219b). Here, switching to the high-rate imaging mode is described as an example, but each of the clients 2 may perform switching to the high-rate imaging mode when switching to the low-rate imaging mode is performed, and a hazard is detected, and the information processing server 1 makes the image acquisition request again.

Then, in step S321, each of the clients 2 continuously transmits the captured image (video) which is imaged to the information processing server 1 in real time (S321a and S321b).

Then, in step S324, the image processing unit 10d of the information processing server 1 analyzes the captured images received from the clients 2 in the hazard target area and performs the security hazard prediction. Specifically, for example, the information processing server 1 transmits an inquiry to a security system of an external system (see FIG. 1), and receives a security signal. A type of security target event, various kinds of feature data used for hazard determination, criminal information, and the like are included in the security signal. For example, a face image of a suspect whose is placed on a wanted list, position information of a crime which is currently occurring, and the like are included. The acquisition of the security signal may be performed at regular intervals in advance.

The image processing unit 10d of the information processing server 1 analyzes the captured images received from the clients 2 in the hazard target area, and extracts a hazard target according to a security type with reference to the security signal. Specifically, for example, the image processing unit 10d can detect a person having a knife, abnormal motion of a person, unnatural motion of persons therearound (for example, all persons running away from a place where there are many persons), or the like in the captured image and determine that there is a hazard when they are identical to hazard events defined in the security signal. Further, it is possible to discover a dangerous person by performing face recognition based on the captured image and performing pattern matching with a face image of a suspect. The analysis result (the hazard information) is transmitted to the security system, and a notification is given to a police department, a fire station, or the like.

Then, when it is determined that there is a hazard (the hazard information is output) (Yes in S327), in step S330, the information processing server 1 gives the alert notification to the user terminal 4.

Then, in step S333, the user terminal 4 performs an alert process in response to the alert notification given from the information processing server 1. As the alert process, various processes may be performed. For example, an alert notification screen may be displayed on the display screen of the user terminal 4 in an interrupt manner, and when music reproduction control is performed through earphones or headphones, an interrupt signal may be mixed with music which is being reproduced to output an alert sound.

Figure 17:
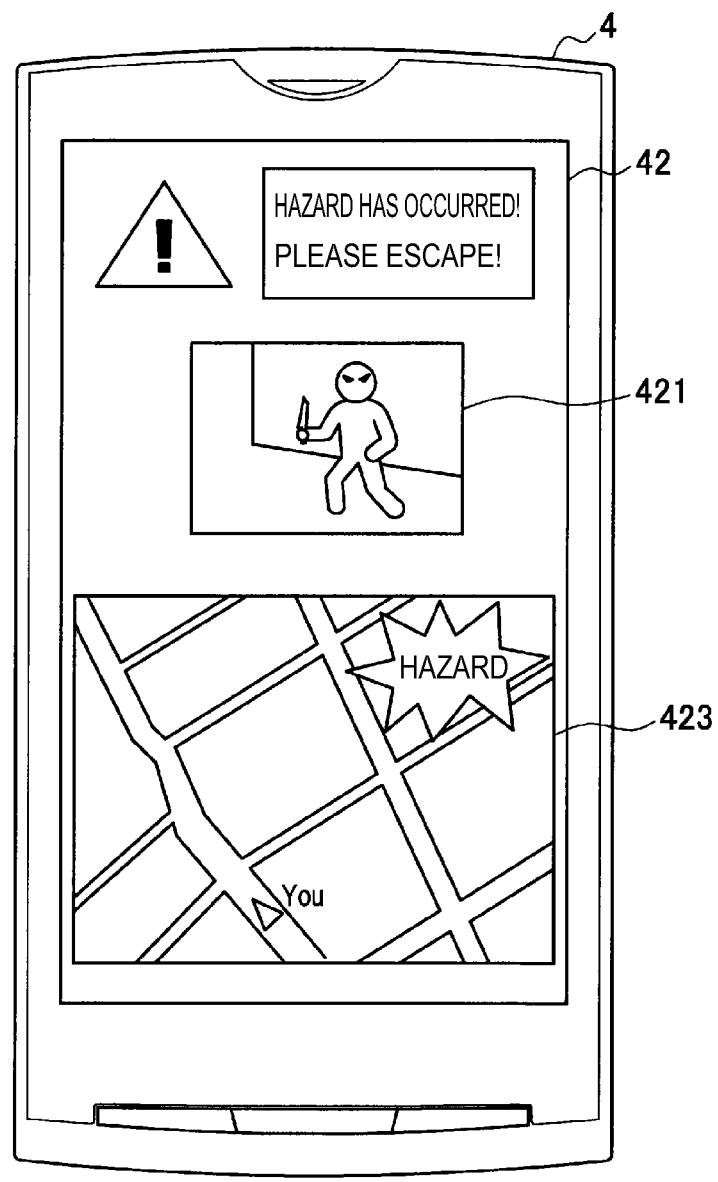
FIG. 17 is a diagram illustrating an example of a display screen for notifying of a security hazard according to the third embodiment.

Here, an example of the alert notification screen is illustrated in FIG. 17. As illustrated in FIG. 17, in the display unit 42 of the user terminal 7, a captured image 421 (video) in which a hazard target is detected is displayed in real time, and a map image 423 is displayed in the lower portion of the display unit 42. In the map image 423, the current position icon indicating the current position of the user and an icon indicating the position of the hazard target are mapped. Thus, the user can intuitively understand a positional relation between the position of the user and the hazard position and escape in a safe direction.

Such alert process details may be customized for each user.

Further, in step S334, the user terminal 4 determines whether or not the user is moving (the user may be changing moving direction to avoid a hazard), and when the user is determined to be moving (Yes in S334), the user terminal 4 causes the process to return to step S306 and newly transmits the position and the movement information to the information processing server 1.

On the other hand, when it is determined that there is no hazard (the hazard information is not output) (No in S327), in step S336, the information processing server 1 transmits the alert cancellation signal to the clients 2 in the hazard target area (S336a and S336b).

Then, in step S339, each of the clients 2 that have received the alert cancellation signal ends the imaging by the imaging unit 26 (S339a and S339b). Specifically, each of the clients 2 transitions from the system operation mode to the deep sleep mode (the standby mode) and ends imaging.

<3-4. Fourth Embodiment>

Next, a fourth embodiment will be described with reference to FIG. 18. In the fourth embodiment, an information processing system in which the current position information of the user is extracted more accurately based on the video acquired by the road reflecting mirror type camera (the client 2) located around the user and used as the current position information of the user terminal 4 in each embodiment will be described.

For example, the user terminal 4 may not be equipped with the GPS or may not acquire accurate current position information due to an error occurring in the GPS even when the GPS is installed. In this regard, in the present embodiment, it is possible to more accurately acquire the current position information of the user by analyzing the video acquired by the road reflecting mirror type camera (the client 2) and recognizing the face image of the user.

Figure 18:
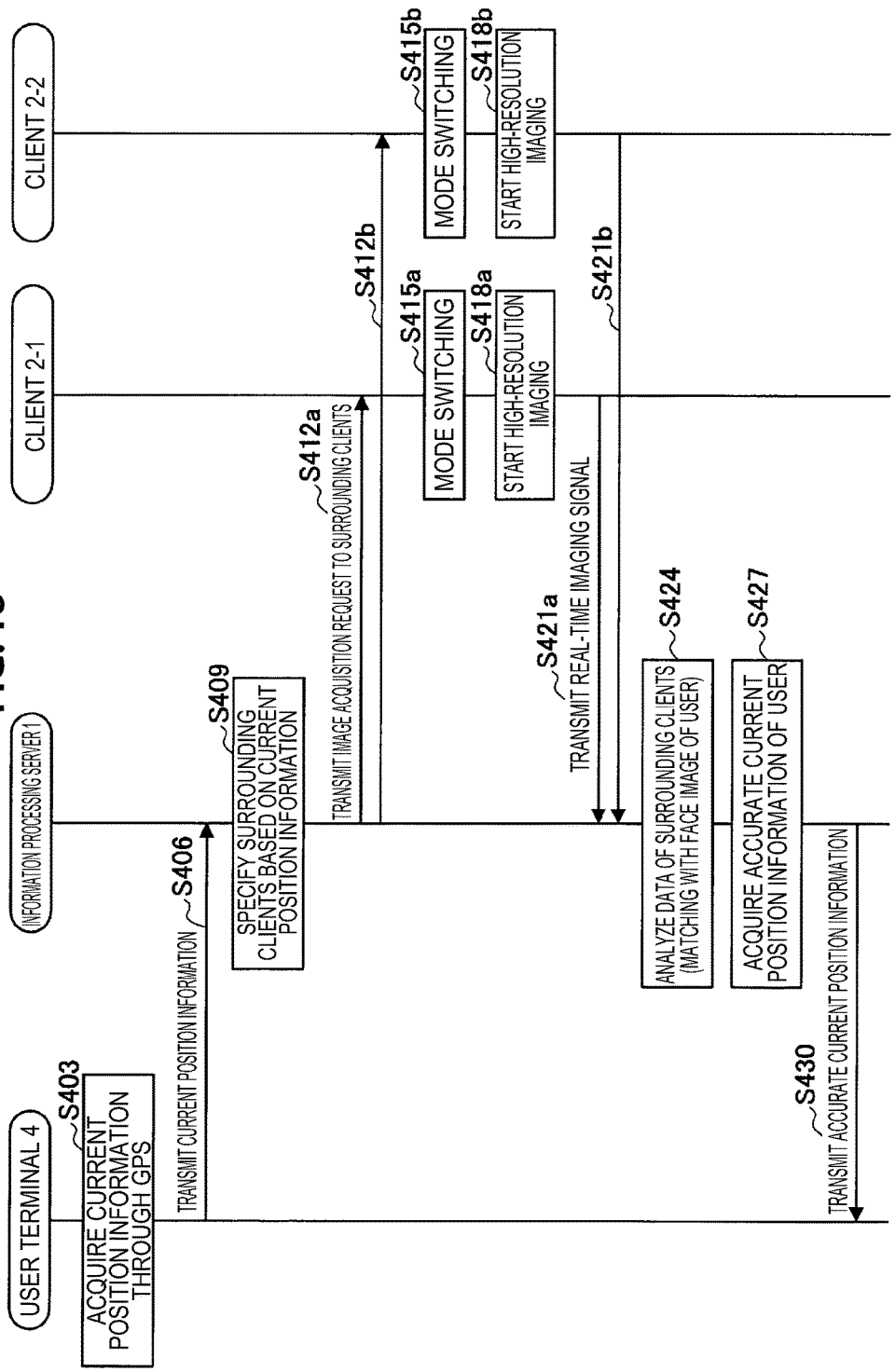
FIG. 18 is a sequence diagram illustrating an example of a current position information provision process according to a fourth embodiment.

FIG. 18 is a sequence diagram illustrating an example of a current position information provision process according to the fourth embodiment. As illustrated in FIG. 18, first, in step S403, the user terminal 4 acquires rough current position information through the GPS.

Then, in step S406, the user terminal 4 transmits the rough current position information to the information processing server 1.

Then, in step S409, the camera search unit 10a of the information processing server 1 specifies the clients 2 installed around the user based on the rough current position information with reference to the map information.

Then, in step S412, the information processing server 1 transmits the image acquisition request to the specified surrounding clients 2 (S412a and S412b).

Then, in step S415, each of the clients 2 performs switching to the high-rate imaging mode in response to the image acquisition request (S415a and S415b), and in step S418, each of the clients 2 starts the high-resolution imaging by the imaging unit 26 (S418a and S418b).

Then, in step S421, each of the clients 2 continuously transmits the captured image (video) which is imaged to the information processing server 1 in real time (S421a and S421b).

Then, in step S424, the image processing unit 10d of the information processing server 1 analyzes the captured images received from the specified surrounding clients 2, performs matching with the user information which is registered in advance (specifically, the face image of the user), and detects the user based on the captured images. Further, the relative position of the user with respect to the client 2 that has acquired the captured image is detected based on the captured image in which the user is detected.

Then, in step S427, the information providing unit 10b of the information processing server 1 extracts the position of the client 2 (fixed position information) that has acquired the captured image in which the user is detected from the map information based on the analysis result of the image processing unit 10d, and acquires accurate current position information of the user based on the position of the client 2 and the detected relative position of the user with respect to the client 2.

Finally, in step S430, the information providing unit 10b of the information processing server 1 transmits the accurate current position information of the user to the user terminal 4.

The process of acquiring the user position information according to the fourth embodiment has been described above. Further, when the user terminal 4 does not include a position detecting unit such as the GPS, the user terminal 4 may detect the surrounding clients 2, acquire an identification signal, and transmit the identification signal to the information processing server 1 as the rough current position information.

<3-5. Fifth Embodiment>

Next, a fifth embodiment will be described with reference to FIGS. 19 to 21. In the fifth embodiment, an information processing system in which various advanced information is generated based on the video acquired by the road reflecting mirror type camera (the client 2) located around the user and provided to the user, and thus more comfortable living is assisted will be described.

In the first and second embodiments, in a situation in which a plurality of clients 2 (2A-1 to 2A-3 and 2B-1 to 2B-3) are installed on the street, the image imaged by the imaging unit 26 is analyzed, and a traffic safety hazard or a security hazard is predicted, but the present disclosure is not limited thereto, and for example, it is possible to generate and provide various advanced information.

Such an operation process of the fifth embodiment will be described with reference to FIG. 19. FIG. 19 is a sequence diagram illustrating an example of an advanced information provision process according to the fifth embodiment.

Figure 19:
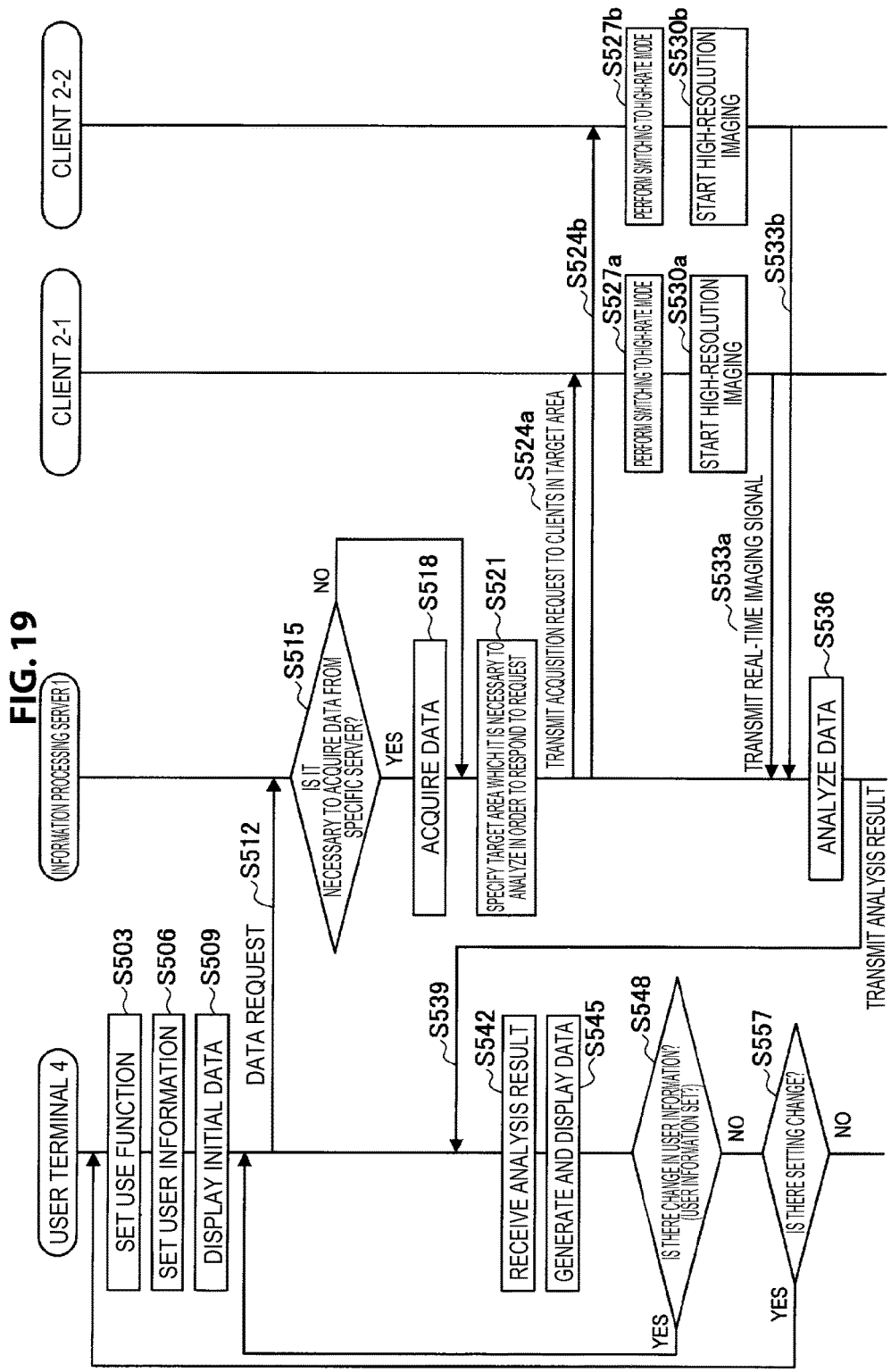
FIG. 19 is a sequence diagram illustrating an example of an advanced information provision process according to a fifth embodiment.
Figure 20:
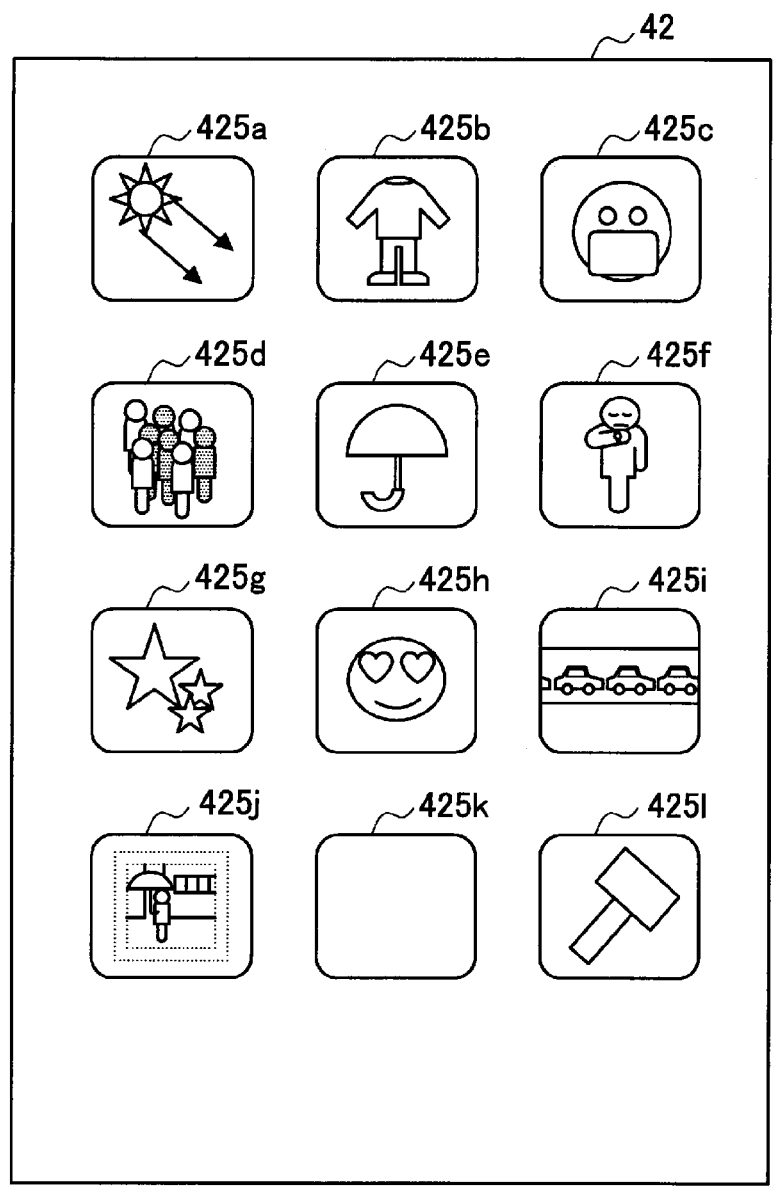
FIG. 20 is a diagram illustrating an example of an advanced information provision icon according to the fifth embodiment.

As illustrated in FIG. 19, first, in step S503, the user terminal 4 sets a use function. Specifically, for example, the user arbitrarily selects a service whose information is desired to be provided. Here, FIG. 20 illustrates an example of an advanced information provision icon according to the present embodiment. As illustrated in FIG. 20, icons 425a to 425l indicating provision of advanced information are displayed on a display screen 42 of the user terminal 4.

For example, the icon 425a is an icon that provides "ultraviolet (UV) light countermeasure information," and extracts a UV shielding product to be used now or cosmetics or clothing to be used now when personal belongings of the user are registered in advance and recommends an advertisement of a UV shielding product to recommend (or a nearby store or the like).

The icon 425b is an icon that provides "hot/cold weather countermeasure information (clothing information)" and recommends clothing. Specifically, a suit to wear now is recommended according to the outside temperature or clothing of persons walking outside which are detected based on the captured image, or when personal belongings are registered in advance, a suit to wear now is extracted among them, and an advertisement of a suit to recommend (or a nearby store or the like) is recommended. Further, recommendation of clothing so that the same clothing as a person is not worn or recommendation of an appropriate formal level before entering a venue may be performed.

The icon 425c is an icon that provides "pollen/power dust/house dust countermeasure information" and informs of whether or not it is desirable to take a pollen/power dust/house dust countermeasure before leaving the house.

The icon 425d is an icon that provides "crowds/line/male-to-female ratio countermeasure information" and presents countermeasure information such as whether or not it is desirable to go somewhere based on a degree of congestion of a place to which the user is going now, a period of waiting time, a male-to-female ratio, or the like.

The icon 425e is an icon that provides "rain-gear information" and present information such as whether or not it is desirable to go out with a rain-gear now when the user stays indoors and does not know an outdoors state. For example, it is possible to present the information based on clothing of persons walking outside detected based on a captured image of a neighborhood area or the presence or absence of rain-gears of persons. Thus, it is possible to prevent a situation in which it rains when the user goes outside without a rain-gear in advance.

The icon 425f is an icon that provides "waiting person countermeasure information" and detects a stress level from a situation of a person who is waiting outside and brings this to the attention of the user.

The icon 425g is an icon that provides "something good will happen/event occurrence information" and informs of an event performed around the user or a thing different from usual which is happening or will happen."

The icon 425h is an icon that provides "presence information of a favorite person" and provides information such as whether or not there is a favorite person based on a captured image of a venue when there is a party or an event.

The icon 425i is an icon that provides "congestion information" and acquires congestion information based on a captured image of a neighborhood road and prevents a situation in which a road close at hand is congested when the user drives out.

The icon 425j is an icon that provides an "image through a wall" and displays an outside image in real time even in a situation in which an outside state is not viewed due to a wall.

The icon 425k is a slot serving as a function which is customized and created by the user.

The icon 425l is a "setting button" icon and transitions to a setting screen in which various settings such as of a detailed function and accuracy are performed.

The user taps and selects an icon indicating information which is desired to be acquired among the icons 425a to 425j, and registers the selected icon as the use function.

Then, in step S506, the user terminal 4 sets user information. Specifically, the user terminal 4 acquires and registers the current position information, the posture information, a surrounding environment, or the like as the user information.

Then, in step S509, the user terminal 4 displays initial data of the set use function based on the set user information.

Then, in step S512, the user terminal 4 transmits a data request of the set use function to the information processing server 1. At this time, the user terminal 4 transmits the set user information together therewith.

Then, in step S515, the information processing server 1 determines whether or not it is necessary to acquire data from a specific server in order to acquire the data of the use function which is requested.

Then, when it is necessary to acquire data from a specific server (Yes in S515), in step S518, the information processing server 1 acquires data from a specific server included in an external system (see FIG. 1).

Then, in step S521, the camera search unit 10a of the information processing server 1 specifies a target area which it is necessary to analyze in order to respond to the request from the user terminal 4.

Then, in step S524, the image acquiring unit 10c of the information processing server 1 transmits the image acquisition request to the clients 2 in the target area (S524a and S524b).

Then, in step S527, each of the clients 2 performs switching to the high-rate imaging operation mode (S527a and S527b), and starts high-resolution imaging (S530a and S530b).

Then, in step S533, each of the clients 2 continuously transmits the captured image (video) which is imaged to the information processing server 1 in real time (S533a and S533b).

Then, in step S536, the image processing unit 10d of the information processing server 1 performs analysis for responding to the request from the user terminal 4 on the captured images collected from the clients 2 in the target area. The image processing unit 10d according to the present embodiment analyzes the captured images imaged by the client 2 and obtains the following data. The user terminal 4 can generate the advanced information based on such information.

(Example of Information Obtained by Analysis of Captured Image)

Information Related to Persons
number of persons: density and configuration distribution
behavior: stopped, crossing, talking, and waiting
expression: delightful, angry, and usual
clothing: formal, casual, watch, shoes, color of clothes, and presence or absence of collar
trend: in fashion and regular
things to be worn on body
sleeve length
shoes: for rainy weather, for clear weather, and much exposure
things to be put around neck: scarf and muffler
Information Related to Environment
sky: light and dark, clouds, form of clouds, and flow of clouds
object: flag—fluttering direction and fluttering period
tree: inclined direction and inclined angle
road: surface reflection, and there is an object thereon Then, in step S539, the information processing server 1 transmits the analysis result to the user terminal 4.

Then, in step S542, the user terminal 4 receives the analysis result, and then in step S545, the user terminal 4 generates and displays the advanced information to which the use function is set. Here, FIG. 21 illustrates an image display example of the advanced information according to the present embodiment.

In an example illustrated in FIG. 21, the icon 425b that provides the "hot/cold weather countermeasure information (the clothing information)," the icon 425e that provides the "rain-gear information," and the icon 425j that provides the "image through a wall (live view)" are set as the use function. In this case, as illustrated in FIG. 21, clothing information 426b to be recommended, rain-gear information 426e to be recommended, and a live view image 426j around the current position of the user are displayed on the display screen 42 of the user terminal 4. The rain-gear information 426e indicates a possibility that an umbrella will be turned inside out due to strong wind.

Thus, even when the user stays indoors and does not know an outdoors state, since the clothing information or the rain-gear information is presented based on a captured image of a surrounding (outside) area which is actually imaged in real time, it is possible to avoid a situation in which it rains when the user goes outside without a rain-gear.

Then, when there is a change in the user information (specifically, a change in the user information such as the current position) (Yes in S548), the user terminal 4 causes the process to proceed to step S512, transmits the user information which is newly set, and transmits the data request.

Further, when there is a setting change of the use function (Yes in S557), the process returns to step S503, and the process subsequent to S503 is repeated.

In the above-described operation process, the information processing server 1 mainly analyzes the captured image, and the user terminal 4 generates the advanced information based on the analysis result, but the analysis of the captured image may be shared by the respective devices. For example, the icons 425i to 425l may be processed and obtained by the user terminal, and the icons 425a, 425e, and 425g may be processed and obtained by the client, and the icons 425b, 425c, 425d, 425f, and 425h may be processed and obtained by the server.

<<6. CONCLUSION>>

As described above, in the information processing system according to an embodiment of the present disclosure, information based on captured images obtained in real time by a plurality of road reflecting mirror cameras installed on a street is provided to the user, and thus it is possible to assist more comfortable and safer living.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program causing hardware such as a CPU, a ROM, and a RAM installed in the server 1, the client 2, and the user terminal 4 to implement the functions of the information processing server 1, the client 2, and the user terminal 4. Further, a computer readable storage medium having the computer program stored therein may also be provided.

Further, the function of the information processing server 1 may be implemented by the client 2.

Further, the client 2 is not limited to the road reflecting mirror type camera, and may be, for example, a fixed camera, a monitoring camera, an installed camera which is privately owned, a camera which is owned by another person, or the like.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device, including:
a search unit configured to search for an imaging device around a specific information processing device;

a providing unit configured to provide information related to the searched imaging device and an angle of view of the imaging device to a user; and an acquiring unit configured to acquire an image imaged by an imaging device selected by the user, wherein the providing unit provides the image acquired by the acquiring unit to the user.

(2)

The information processing device according to (1), wherein the search unit searches for a surrounding imaging device according to a position of the information processing device.

(3)

The information processing device according to (1) or (2), wherein the search unit searches for an imaging device positioned in a direction the user is facing, and the acquiring unit acquires an image imaged by the searched imaging device.

(4)

The information processing device according to (3), further including:

an image processing unit configured to evaluate safety of the user by analyzing the acquired image, wherein the providing unit performs control such that an evaluation result is provided to the user.

(5)

The information processing device according to (4), wherein the image processing unit evaluates the safety of the user according to a detection result of a mobile object which is likely to approach the user based on the acquired image.

(6)

The information processing device according to (4), wherein the image processing unit evaluates the safety of the user according to a detection result of a person who is registered in advance based on the acquired image.

(7)

The information processing device according to any one of (1) to (6), wherein the providing unit generates a user interface indicating a correspondence relation between the information related to the angle of view of the imaging device and the image acquired from the imaging device, and provides the user interface to the user.

(8)

A storage medium having a program stored therein, the program causing a computer to function as:

a search unit configured to search for an imaging device around a specific information processing device;

a providing unit configured to provide information related to the searched imaging device and an angle of view of the imaging device to a user; and an acquiring unit configured to acquire an image imaged by an imaging device selected by the user, wherein the providing unit provides the image acquired by the acquiring unit to the user.

(9)

A control method, including:

searching for an imaging device around a specific information processing device;

providing information related to the searched imaging device and an angle of view of the imaging device to a user;

acquiring an image imaged by an imaging device selected by the user; and providing the acquired image to the user.

REFERENCE SIGNS LIST 1, 1A, 1B information processing server
10 main control unit
10a camera search unit
10b information providing unit
10c image acquiring unit
10d image processing unit
11 communication unit
14 DB
2, 2A-1 to 2A-3, 2B-1 to 2B-3 client (road reflecting mirror type camera)
3, 3A, 3B network
4 user terminal
5 relay server

The invention claimed is:

1. An information processing device, comprising:
processing circuitry configured to
receive current position and posture information from a terminal device, search for a row of imaging devices positioned in a predetermined direction based on the current position and posture information received from the terminal device,
transmit an image acquisition request to an imaging device from the row of imaging devices that is closest to the terminal device,
receive a first video in real time from the imaging device,
transmit the first video and one or more of an installation position of the imaging device and an angle of view of the imaging device to the terminal device,
receive a switching instruction from the terminal device when the terminal device selects a target imaging device,
search for the target imaging device in response to receiving the switching instruction,
receive a second video in real time from the selected target imaging device in response to an acquisition request triggered by the search for the target imaging device,
transmit the second video to the terminal device, and
control switching from the first video to the second video includes interposing an effect image between the first video and the second video.

2. The information processing device according to claim 1, wherein the processing circuitry is further configured to search for a surrounding imaging device according to a position of the information processing device.

3. The information processing device according to claim 1, wherein the processing circuitry is further configured to search for an imaging device positioned in a direction a user is facing.

4. The information processing device according to claim 3, wherein the processing circuitry is further configured to evaluate safety of the user by analyzing the acquired image, and perform control such that an evaluation result is provided to the user.

5. The information processing device according to claim 4, wherein the processing circuitry is further configured to evaluate the safety of the user according to a detection result of a mobile object which is likely to approach the user based on the acquired image.

6. The information processing device according to claim 4, wherein the processing circuitry is further configured to evaluate the safety of the user according to a detection result of a person who is registered in advance based on the acquired image.

7. The information processing device according to claim 1, wherein the processing circuitry is further configured to
generate a user interface indicating a correspondence relation between the angle of view of the imaging device and the image acquired from the imaging device, and
provide the user interface to the terminal device.

8. A non-transitory computer-readable storage medium storing computer-readable instructions thereon which, when executed by a computer, cause the computer to perform a method, the method comprising:
searching for a row of imaging devices positioned in a predetermined direction based on the current position and posture information received from a terminal device;
transmitting an image acquisition request to an imaging device from the row of imaging devices that is closest to the terminal device;
receiving a first video in real time from the imaging device;
transmitting the first video and one or more of an installation position of the imaging device and an angle of view of the imaging device to the terminal device;
receiving a switching instruction from the terminal device when the terminal device selects a target imaging device;
searching for the target imaging device in response to receiving the switching instruction;
receiving a second video in real time from the selected target imaging device in response to an acquisition request triggered by the search for the target imaging device;
transmitting the second video to the terminal device; and
controlling switching from the first video to the second video includes interposing an effect image between the first video and the second video.

9. A control method, comprising:
searching, via processing circuitry, for a row of imaging devices positioned in a predetermined direction based on the current position and posture information received from a terminal device;
transmitting, via the processing circuitry, an image acquisition request to an imaging device from the row of imaging devices that is closest to the terminal device;
receiving, via the processing circuitry, a first video in real time from the imaging device;
transmitting, via the processing circuitry, the first video and one or more of an installation position of the imaging device and an angle of view of the imaging device to the terminal device;
receiving, via the processing circuitry, a switching instruction from the terminal device when the terminal device selects a target imaging device;
searching, via the processing circuitry, for the target imaging device in response to receiving the switching instruction;
receiving, via the processing circuitry, a second video in real time from the selected target imaging device in response to an acquisition request triggered by the search for the target imaging device;
transmitting, via the processing circuitry, the second video to the terminal device; and
controlling, via the processing circuitry, switching from the first video to the second video includes interposing an effect image between the first video and the second video.

* * * * *